(12) United States Patent
Miyazaki

(10) Patent No.: US 9,001,692 B2
(45) Date of Patent: Apr. 7, 2015

(54) ROUTE CALCULATION APPARATUS AND ROUTE CALCULATION METHOD

(75) Inventor: Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 12/695,330

(22) Filed: Jan. 28, 2010

(65) Prior Publication Data

US 2010/0208721 A1    Aug. 19, 2010

(30) Foreign Application Priority Data

Feb. 16, 2009    (JP) .................................. 2009-033139

(51) Int. Cl.
*H04L 12/28* (2006.01)
*H04L 12/721* (2013.01)
*H04L 12/715* (2013.01)

(52) U.S. Cl.
CPC ................ *H04L 45/44* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 2004/0184441 A1* | 9/2004 | Wu et al. ........................ | 370/351 |
| 2005/0271060 A1* | 12/2005 | Kodialam et al. ............. | 370/394 |
| 2008/0016221 A1* | 1/2008 | Xu et al. ........................ | 709/226 |
| 2008/0075008 A1 | 3/2008 | Kano | |
| 2008/0130627 A1* | 6/2008 | Chen et al. .................... | 370/351 |
| 2009/0182894 A1* | 7/2009 | Vasseur et al. ................ | 709/239 |

FOREIGN PATENT DOCUMENTS

| | | |
|---|---|---|
| JP | 2004-80211 | 3/2004 |
| JP | 2005-252368 | 9/2005 |
| JP | 2008-206095 | 9/2008 |

OTHER PUBLICATIONS

Japanese Notification of Reason for Refusal issued Dec. 4, 2012, in corresponding Japanese Patent Application No. 2009-033139.
Japanese Office Action issued Sep. 18, 2012 in corresponding Japanese Patent Application No. 2009-033139.

* cited by examiner

*Primary Examiner* — Nicholas Sloms
(74) *Attorney, Agent, or Firm* — Staas & Halsey LLP

(57) ABSTRACT

A route calculation apparatus calculates an intra-domain route in a target domain assigned with the route calculation apparatus. The intra-domain route is a part of a route for a target path in a network divided into plural domains. Each of the plural domains includes at least one node device. The target path passes through transit domains out of the plural domains from a source node device included in a source domain to a destination node device included in a destination domain. The route calculation apparatus includes a calculator and a route calculation requester. The calculator calculates the intra-domain route in the target domain. The route calculation requester requests a first route calculation apparatus assigned to the destination domain to calculate an intra-domain route in the destination domain when the target domain is one of the plural domains except the destination domain and except domains adjacent to the destination domain.

9 Claims, 24 Drawing Sheets

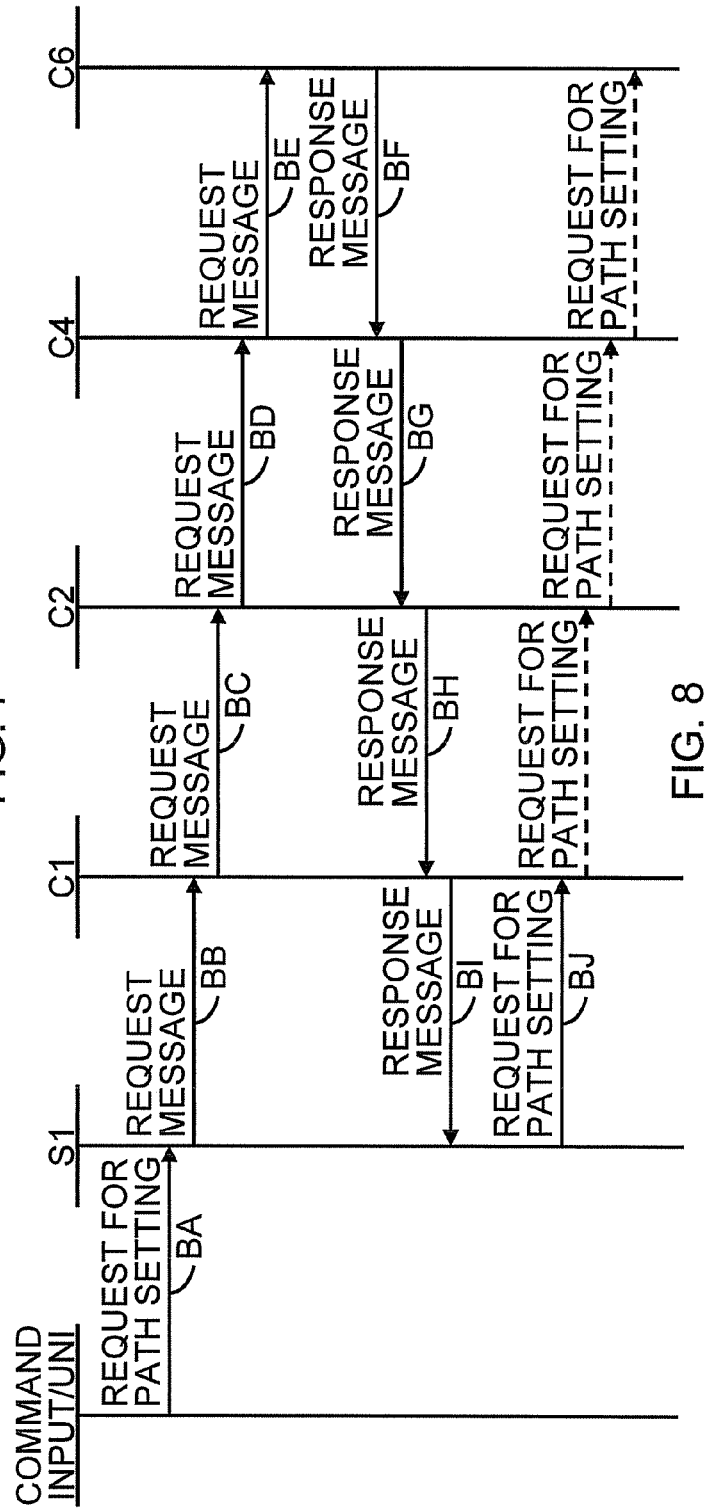

FIG. 13

| 702 | 704 | 706 | 708 | 710 | 1302 |
|---|---|---|---|---|---|
| PATH ID | SOURCE NODE ID | DEST. NODE ID | BAND | CALC. TARGET DOMAIN | RECOVERY TYPE |
| 1001 | S1 | D1 | STS1 | A6 | LINK-INDEPENDENT |

FIG. 14

| 1102 | 1104 | 1106 | 1108 | 1110 | 1402 | 1112 |
|---|---|---|---|---|---|---|
| PATH ID | SOURCE NODE ID | DEST. NODE ID | BAND | CALC. TARGET DOMAIN | RECOVERY TYPE | ROUTE LIST |
| 1001 | S1 | D1 | STS1 | A6 | LINK-INDEPENDENT | {D1...A6-2, D1...A6-3} |

FIG. 15

| 702 | 704 | 706 | 708 | 710 | 1302 | 1502 |
|---|---|---|---|---|---|---|
| PATH ID | SOURCE NODE ID | DEST. NODE ID | BAND | CALC. TARGET DOMAIN | RECOVERY TYPE | CAND. COUNT |
| 1001 | S1 | D1 | STS1 | A6 | LINK-INDEPENDENT | 2 |

FIG. 16

| PATH ID 1102 | SOURCE NODE ID 1104 | DEST. NODE ID 1106 | BAND 1108 | CALC. TARGET DOMAIN 1110 | RECOVERY TYPE 1402 | CAND. COUNT 1602 | ROUTE LIST 1112 |
|---|---|---|---|---|---|---|---|
| 1001 | S1 | D1 | STS1 | A6 | LINK-INDEPENDENT | 2 | {D1...A6-2}, {D1...A6-3}, {D1...A6-1}, {D1...A6-3} |

FIG. 17

| PATH ID 702 | SOURCE NODE ID 704 | DEST. NODE ID 706 | BAND 708 | ROUTE DATA 1702 | EXECUTION FLAG 1704 |
|---|---|---|---|---|---|
| 1001 | S1 | D1 | STS1 | A1, A2, A4, A6 | 1, 0, 1, 1 |

FIG. 18

| PATH ID 1102 | SOURCE NODE ID 1104 | DEST. NODE ID 1106 | BAND 1108 | ROUTE DATA 1802 | EXECUTION FLAG 1804 | ROUTE LIST 1112 |
|---|---|---|---|---|---|---|
| 1001 | S1 | D1 | STS1 | A1, A2, A4, A6 | 1, 0, 1, 1 | {D1...A6-2}, {A4-5...A4-2}, {A1-2...S1} |

| PATH ID (702) | SOURCE NODE ID (704) | DEST. NODE ID (706) | BAND (708) | CALC. TARGET DOMAIN (710) | MAXIMUM DOMAIN COUNT (2202) | | |
|---|---|---|---|---|---|---|---|
| 1001 | S1 | D1 | STS1 | A6 | 2 | | |

FIG. 22

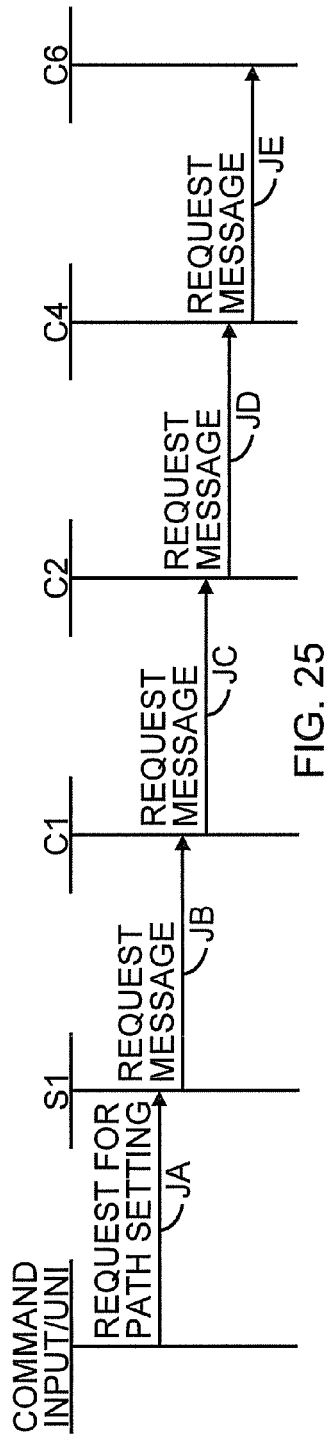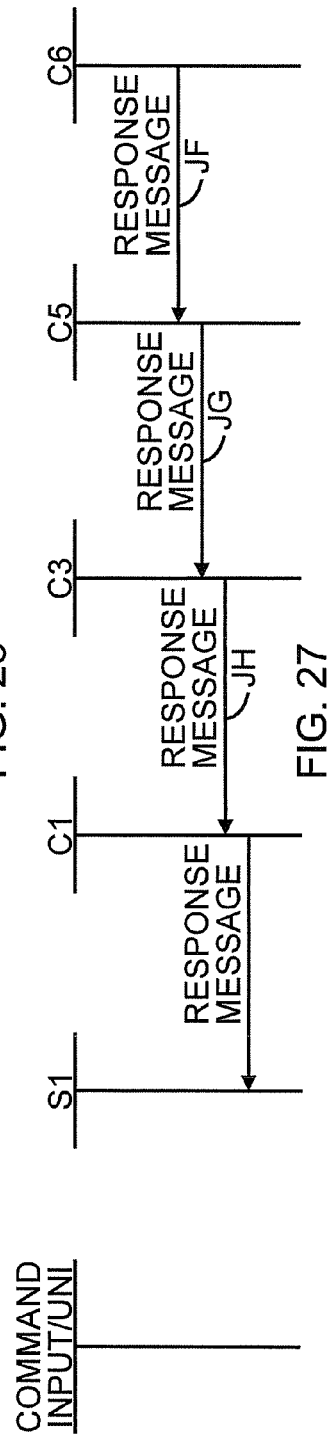

FIG. 30

| PATH ID 702 | SOURCE NODE ID 704 | DEST. NODE ID 706 | BAND 708 | CALC. TARGET DOMAIN 710 | RECOVERY TYPE 1302 | CAND. COUNT 1502 | ROUTE IN SOURCE DOMAIN 3002 |
|---|---|---|---|---|---|---|---|
| 1001 | S1 | D1 | STS1 | A6 | LINK-INDEPENDENT | 2 | {S1...A1-1, S1...A1-3}, {S1...A1-2, S1...A1-4} |

FIG. 31

| PATH ID 1102 | SOURCE NODE ID 1104 | DEST. NODE ID 1106 | BAND 1108 | CALC. TARGET DOMAIN 1110 | RECOVERY TYPE 1402 | CAND. COUNT 1602 | ROUTE IN SOURCE DOMAIN 3102 | ROUTE LIST 1112 |
|---|---|---|---|---|---|---|---|---|
| 1001 | S1 | D1 | STS1 | A6 | LINK-INDEPENDENT | 2 | {S1...A1-1, S1...A1-3}, {S1...A1-2, S1...A1-4} | {D1...A6-2, D1...A6-3}, {D1...A6-1, D1...A6-3} |

ROUTE CALCULATION APPARATUS AND ROUTE CALCULATION METHOD

CROSS-REFERENCE TO RELATED APPLICATION

This application is based upon and claims the benefit of priority of the prior Japanese Patent Application No. 2009-033139, filed on Feb. 16, 2009, the entire contents of which are incorporated herein by reference.

FIELD

The embodiments discussed herein are related to a route calculation apparatus that calculates a route of a path for transmitting a signal through a communication network and to a route calculation method thereof.

BACKGROUND

When a route of a path for transmitting a signal through a network is calculated, a calculation method as follows is performed. The network is divided into plural areas and the route of the path that passes through the areas is calculated for each area. In the specification, each of the plural areas obtained by dividing the network is referred to as a "domain". FIG. 1 is a diagram illustrating an example of a network divided into plural domains. Reference symbol NT denotes a network. Reference symbol ND denotes a node device (also referred to as a "node"). The network NT includes plural node devices ND and links for connecting the node devices ND. The network NT is divided into plural domains. Reference symbols A1 to A3 denote domains formed by dividing the network NT.

Each domain is assigned with a route calculation apparatus that calculates the route in the domain. In the specification, the domain for which the route calculation apparatus performs route calculation may be referred to as a "target domain" of the route calculation apparatus. The route calculation apparatus assigned to each domain generates summarized data which is simplified data in regard to the network topology of the target domain and notifies the summarized data to the route calculation apparatuses assigned to other domains. Thus, the summarized data of a given domain is shared among the route calculation apparatuses of other domains except the given domain. The given domain obtains information on the network topology of each of the other domains except the given domain in the form of the summarized data.

In the calculation of the route of a path (referred to as a "target path") to be set, a route calculation apparatus of a source domain including a source node device of the target path starts route calculation for the target domain and path setting by signaling. The route calculation apparatus executes calculation of a route within the target domain in accordance with detailed network topology data of the target domain, which is held in the route calculation apparatus. In the specification, a route of the target path within each domain may be referred to as an "intra-domain route". When calculating the intra-domain route, the route calculation apparatus determines, in accordance with the summarized data, to which adjacent domain the intra-domain route is connected.

When a path of a certain domain has been set, a route calculation apparatus of an adjacent domain adjacent to the certain domain similarly calculates an intra-domain route connected to the set path and then sets the path therein. Each route calculation apparatus executes the similar process until reaching a destination domain including a destination node device, thereby setting the path passing through plural domains.

It is proposed that, in a hierarchical communication network divided into plural areas, when setting plural paths between a source node and a destination node via relay areas, a route calculation apparatus of a source area calculates relay routes of the paths in the source area, and each route calculation apparatus of a destination area and each relay area through which plural paths pass calculates relay routes of the paths in the destination area and each relay area in accordance with calculated relay routes of the paths.

Further, it is proposed that, in a large-scale network divided into plural areas, priority is placed among area boundary nodes in the same area, and cooperation is performed among the area boundary nodes, thereby setting a backup path without a shared link with a main path between the source-side end and the destination-side end.

Furthermore, a transmission device is proposed in a network divided into at least two areas including a first area and a second area. The transmission device is used as a boundary node between the two areas and sets a path between a source node in the first area and a destination node in the second area. The transmission device calculates, upon receiving from the first area a path request message based on a signaling protocol for setting a path, information relating to a route between the source node and the destination node in accordance with topology data of the first area and topology data of the second area. The transmission device transmits, to the source node, a message based on the signaling protocol, which includes the calculated information relating to the route.

Japanese Laid-open Patent Publication No. 2005-252368, Japanese Laid-open Patent Publication No. 2004-80211, and Japanese Laid-open Patent Publication No. 2008-85642 disclose related techniques.

SUMMARY

According to an aspect of the present invention, provided is a route calculation apparatus for calculating an intra-domain route in a target domain assigned with the route calculation apparatus. The intra-domain route is a part of a route for a target path in a network divided into plural domains. Each of the plural domains includes at least one node device. The target path passes through transit domains out of the plural domains from a source node device included in a source domain to a destination node device included in a destination domain. The route calculation apparatus is communicable with other route calculation apparatuses assigned to other domains. The route calculation apparatus includes a calculator and a route calculation requester.

The calculator calculates the intra-domain route in the target domain.

The route calculation requester requests a first route calculation apparatus assigned to the destination domain to calculate an intra-domain route in the destination domain when the target domain is one of the plural domains except the destination domain and except domains adjacent to the destination domain.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a data format of a request message according to an embodiment of the present invention;

FIG. 8 is a sequence diagram illustrating an example of message exchange in route calculation according to an embodiment of the present invention;

FIG. 13 is a diagram illustrating an example of a data format of a request message according to an embodiment of the present invention;

FIG. 14 is a diagram illustrating an example of a data format of a response message responding to the request message illustrated in FIG. 13;

FIG. 15 is a diagram illustrating an example of a data format of a request message according to an embodiment of the present invention;

FIG. 16 is a diagram illustrating an example of a data format of a response message responding to the request message illustrated in FIG. 15;

FIG. 17 is a diagram illustrating an example of a data format of a request message according to an embodiment of the present invention;

FIG. 18 is a diagram illustrating an example of a data format of a response message responding to the request message illustrated in FIG. 17;

FIG. 22 is a diagram illustrating an example of a data format of a request message according to an embodiment of the present invention;

FIG. 25 is a sequence diagram illustrating an example of message exchange in route calculation according to an embodiment of the present invention;

FIG. 26 is a diagram illustrating an example of a data format of a response message responding to the request message illustrated in FIG. 22;

FIG. 27 is a sequence diagram illustrating an example of a continuation of the sequence illustrated in FIG. 25;

FIG. 30 is a diagram illustrating an example of a data format of a request message according to an embodiment of the present invention;

FIG. 31 is a diagram illustrating an example of a data format of a response message responding to the request message illustrated in FIG. 30;

DESCRIPTION OF EMBODIMENTS

A conventional route calculation method using summarized data of a network topology of a domain other than a target domain may pose a problem since a complete network topology of the other domain is not known. Suppose that, for example, path setting of an intra-domain route in a certain domain has completed, and that an intra-domain route in the next domain adjacent to the certain domain is to be calculated. For the sake of simplicity, the certain domain for which the path setting has been completed is referred to as a "domain A", and the next domain adjacent to the domain A is referred to as a "domain B".

The summarized data of the domain B referred to when calculating the intra-domain route in the domain A does not represent the complete network topology of the domain B. Therefore, when calculating the intra-domain route in the domain B, it may become clear that no route is ensured to satisfy a condition for the target path that starts from a boundary node device in the domain B, which connects to the intra-domain route in the domain A. When the route calculation fails in a domain in the middle of the path, the route calculation restarts from the route in the source domain. This may cause an increase in setting time of the path and an increase in amount of calculation consumed for the route calculation.

In particular, when implementing protection in which an active path and a backup path are set for the target path, a risk of failing route calculation for the source domain and the destination domain is higher than that for a domain (referred to as a "transit domain") through which the path merely passes. This is because there are both routes for the active path and the backup path in the source domain and the destination domain. In contrast, either of the active path or the backup path alone may pass through transit domains.

Therefore, It is preferable for the route calculation apparatus to reduce the frequency of failing the route calculation for the destination domain.

According to the embodiments, the route calculation for the destination domain may be performed before the route calculation for another domain. Therefore, it may be possible to relax the restriction of the route calculation for the destination domain, which suppresses the frequency of failing the route calculation for the destination domain.

Figure 1:
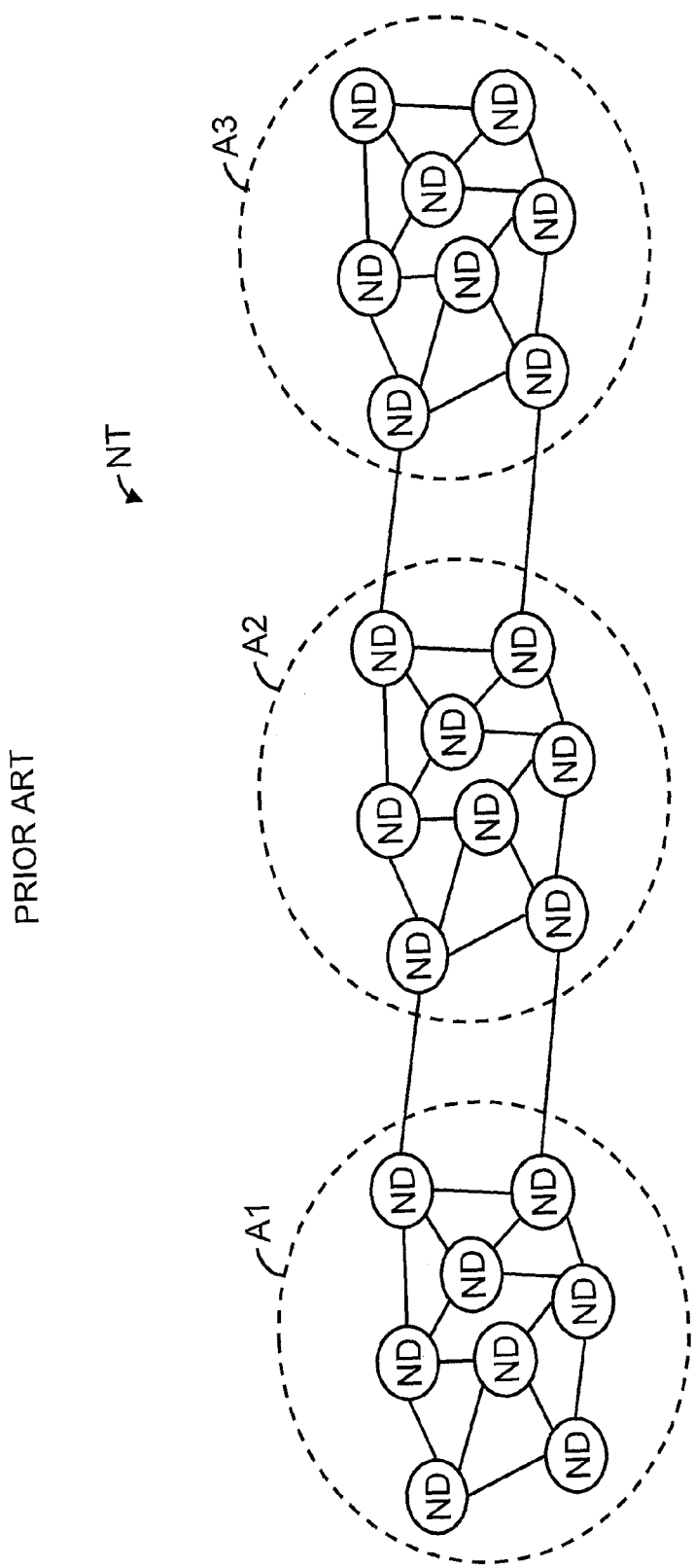
FIG. 1 is a diagram illustrating an example of a network divided into plural domains.
Figure 2:
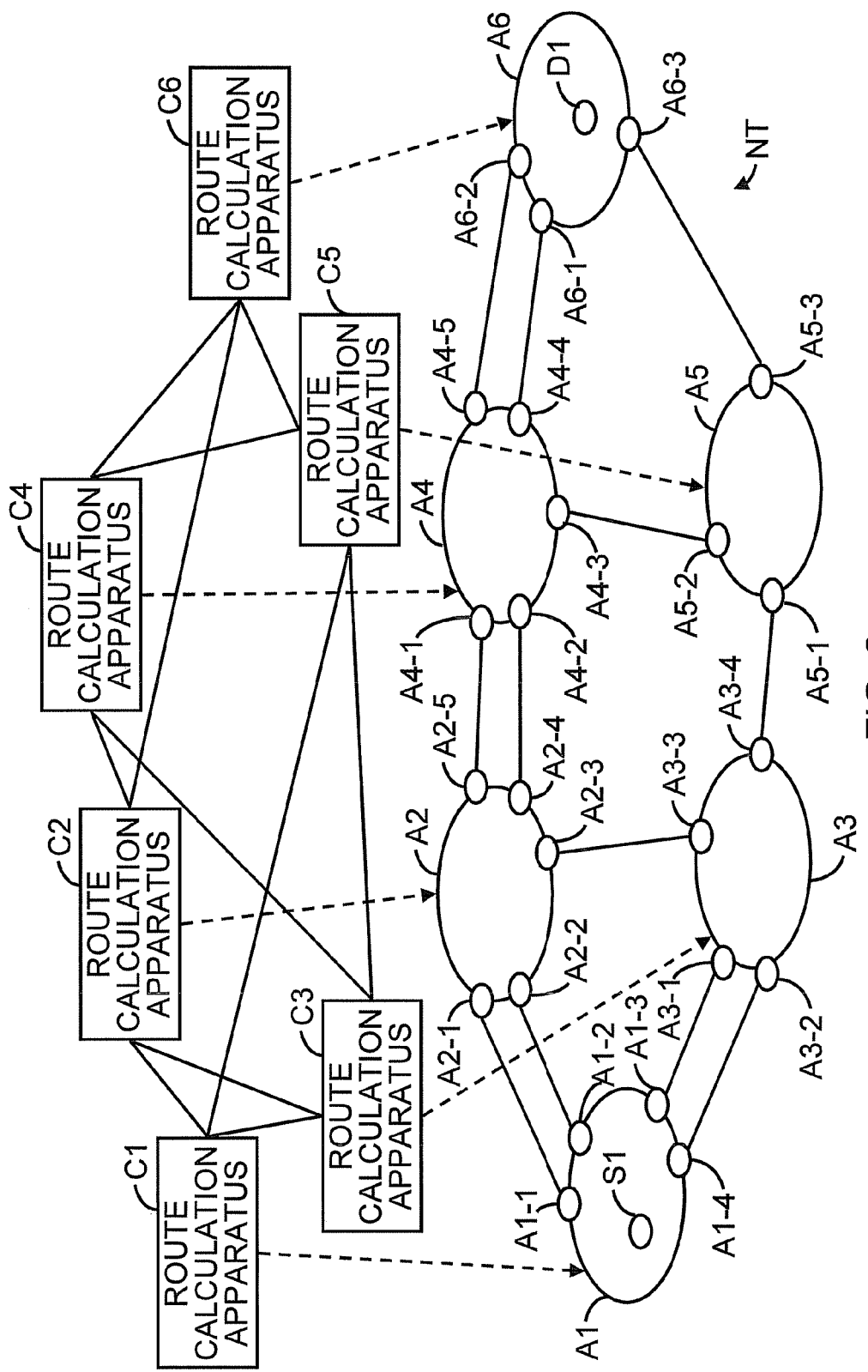
FIG. 2 is a diagram illustrating an example of a configuration of a network according to an embodiment of the present invention.

Hereinbelow, discussions on embodiments will be given with reference to the drawings. FIG. 2 is a diagram illustrating an example of a configuration of a network according to an embodiment of the present invention. Reference symbol NT denotes a network, reference symbols A1 to A6 denote domains, and reference symbols C1 to C6 denote route calculation apparatuses. The network NT is divided into plural domains A1 to A6.

Reference symbols A1-1 to A1-4 denote node devices belonging to the domain A1 and having links with nodes in domains outside of the domain A1. In the specification, a "boundary node device" denotes a node device belonging to a specific domain and having a link with a node device in a domain outside of the specific domain.

Reference symbols A2-1 to A2-5 denote boundary node devices belonging to the domain A2. Reference symbols A3-1 to A3-4 denote boundary node devices belonging to the domain A3. Reference symbols A4-1 to A4-5 denote boundary node devices belonging to the domain A4. Reference symbols A5-1 to A5-3 denote boundary node devices belonging to the domain A5. Reference symbols A6-1 to A6-3 denote boundary node devices belonging to the domain A6.

In the specification, a path to be set by path setting may be referred to as a "target path". Reference symbol S1 denotes a source node device of a target path. Reference symbol D1 denotes a destination node device of the target path. In FIG. 2, node devices belonging to the domains A1 to A6 are not illustrated except for the source node device, the destination node device, and the boundary node devices, for the sake of simplicity.

The route calculation apparatuses C1 to C6 calculate intra-domain routes in the domains A1 to A6, respectively. In the specification, a specific domain for which a certain route calculation apparatus calculates the intra-domain route may be referred to as a "target domain" of the certain route calculation apparatus. For example, the domain A1 is a target domain of the route calculation apparatus C1. Further, a specific route calculation apparatus that calculates the intra-domain route in a certain domain may be referred to as a route calculation apparatus assigned to the certain domain or a route calculation apparatus of the certain domain. For example, the route calculation apparatus C1 is a route calculation apparatus assigned to the domain A1, or a route calculation apparatus of the domain A1.

The route calculation apparatuses C1 to C6 may be realized as a part of hardware of any of the node devices disposed in the network NT or may be realized as hardware separated from the node devices. Further, one route calculation apparatus does not necessarily have a function for calculating an intra-domain route only in a single domain, but one route calculation apparatus may have a function for calculating intra-domain routes in plural domains.

The route calculation apparatuses C1 to C6 are connected each other via a network for transmitting signals among the route calculation apparatuses. The route calculation apparatuses C1 to C6 may be connected via a communication network different from the network NT. Alternatively, when the route calculation apparatuses C1 to C6 are realized as a part of hardware of the node devices or are connected to any of the node devices, the route calculation apparatuses C1 to C6 may transmit signals via a data communication channel (DCC) of the network NT.

In a discussion given below, it is assumed that the route calculation apparatuses C1 to C6 are realized as a part of hardware of the node devices. However, as mentioned above, the route calculation apparatus is not limited to be realized as a part of the hardware of the node device and may be realized as hardware separated from the node device.

Figure 3:
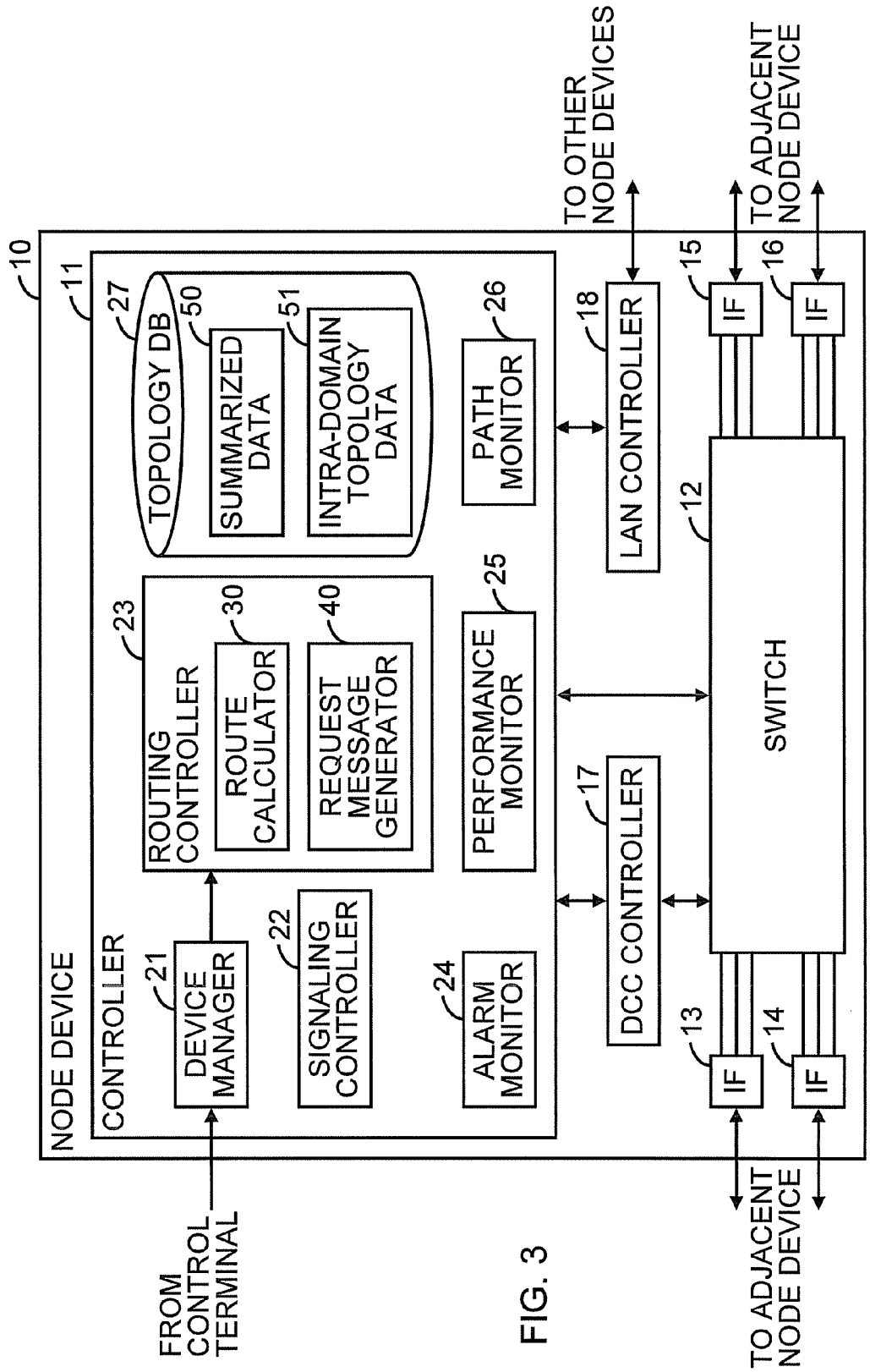
FIG. 3 is a diagram illustrating an example of a system configuration of a node device according to an embodiment of the present invention.

FIG. 3 is a diagram illustrating an example of a system configuration of a node device according to an embodiment of the present invention. Reference symbol 10 denotes a node device, reference symbol 11 denotes a controller, reference symbol 12 denotes a switch (SW), reference symbols 13 to 16 denote interface units (IF), reference symbol 17 denotes a DCC controller, and reference symbol 18 denotes a local area network (LAN) controller. Reference symbol 21 denotes a device manager, reference symbol 22 denotes a signaling controller, reference symbol 23 denotes a routing controller, reference symbol 24 denotes an alarm monitor, reference symbol 25 denotes a performance monitor, and reference symbol 26 denotes a path monitor. Reference symbol 27 denotes a topology database (DB), reference symbol 30 denotes a route calculator, reference symbol 40 denotes a request message generator, reference symbol 50 denotes summarized data, and reference symbol 51 denotes intra-domain topology data.

The node device 10 includes the controller 11, the switch 12, the interface units 13 to 16, the DCC controller 17, and the LAN controller 18. The controller 11 manages and controls setup and operation of the node device 10. The controller 11 includes the device manager 21, the signaling controller 22, the routing controller 23, the alarm monitor 24, the performance monitor 25, the path monitor 26, and the topology database 27.

The device manager 21 manages setup and operation of the node device 10. The device manager 21 receives a command inputted by an operator via a control terminal. A command for requesting path setting is also included in types of commands inputted to the device manager 21. Further, the device manager 21 receives a signal for requesting path setting, which is inputted via a user network interface (UNI). When path setting is requested by the command or the signal, the device manager 21 notifies the routing controller 23 of the request for path setting.

The signaling controller 22 performs an operation for setting the path by executing a signaling protocol. The signaling protocol may be resource reservation protocol traffic engineering (RSVP-TE) or open shortest path first traffic engineering (OSPF-TE), for example. The routing controller 23 performs a process related to the route calculation of the path. When the node device 10 has a function of a route calculation apparatus for calculating an intra-domain route in a domain, the routing controller 23 may include the route calculator 30 as the route calculation apparatus realized as a part of hardware of the node device 10.

The routing controller 23 includes a request message generator 40. The request message generator 40 generates a request message, which will be discussed later, when the device manager 21 has received a request for path setting. The routing controller 23 transmits the request message generated by the request message generator 40 to another node device having the route calculator 30 for calculating the intra-domain route in the domain to which the node device 10 belongs.

The DCC controller 17 transmits and receives control signals such as a request message or a response message, which will be discussed later, to/from another node device via a data communication channel of the network NT. The LAN controller 18 transmits and receives control signals such as the request message or the response message to/from another node device via a LAN other than the network NT. The DCC controller 17 and the LAN controller 18 have a function for transmitting the request message generated by the node device 10 to the route calculator 30. Discussions on the routing controller 23 and the route calculator 30 will be given later.

The alarm monitor 24 monitors a failure occurred in a transmission channel or the node device 10. The performance monitor 25 monitors the transmission quality of a signal transmitted from the node device 10. The path monitor 26 monitors a failure occurred in the set path. The topology database 27 stores the summarized data 50 and the intra-domain topology data 51.

The summarized data 50 is obtained by summarizing the network topologies in the domains A1 to A6 of the network NT. The summarized data 50 includes, with respect to each of the domains A1 to A6 of the network NT, at least data regarding node devices in each domain and data regarding boundary node devices in each domain. The summarized data 50 may include, with respect to each of the boundary node devices in a domain, data regarding an available band for a path, which passes through the domain, between the boundary node devices. The summarized data 50 is advertised among the node devices in the network NT by a signaling protocol such as OSPF-TE.

The intra-domain topology data 51 is network topology data of the domain to which the node device 10 belongs. The intra-domain topology data 51 may include data regarding node devices in the domain and links for connecting the node devices and data regarding transmission resource available in each link. The intra-domain topology data 51 includes sufficient data to calculate a route which matches a condition for a target path in calculating, by the route calculator 30, an intra-domain route in a target domain through which the target path passes.

The interface units 13 to 16 are connected to another node device or terminal device, and receive and transmit signals from/to the other node device or terminal device. The switch 12 connects the interface units 13 to 16 in accordance with setup data of the path set by the signaling controller 22 to exchange signals with the other node device or terminal device connected to the node device 10.

Figure 4:
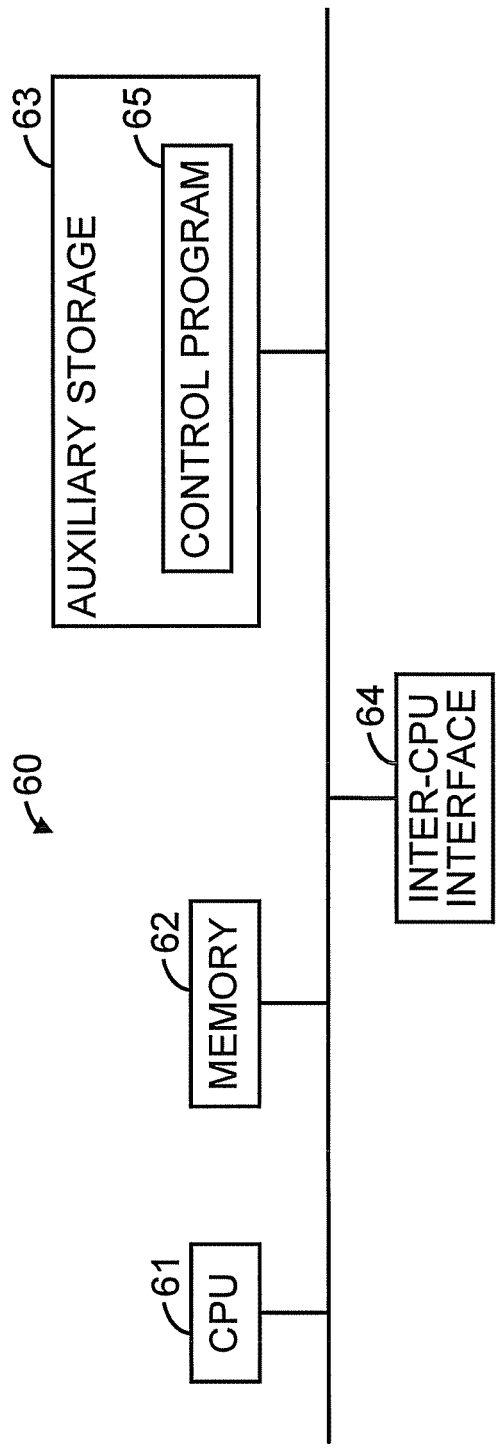
FIG. 4 is a diagram illustrating an example of a hardware configuration of a routing controller, which is realized on a computer, of a node device according to an embodiment of the present invention.

Next, a discussion will be given on the routing controller 23. FIG. 4 is a diagram illustrating an example of a hardware configuration of a routing controller, which is realized on a computer, of a node device according to an embodiment of the present invention. The routing controller 23 is realized on a computer 60 having a CPU 61, a memory 62, an auxiliary storage 63, and an inter-CPU interface 64. The computer 60 may be a dedicated computer for performing process of the routing controller 23 and, alternatively, may also serve as a computer for performing process of another component, e.g., the device manager 21 or the signaling controller 22, of the node device 10.

The auxiliary storage 63 is a storage device realized by a hard disk, a non-volatile memory, or the like. The auxiliary storage 63 stores a control program 65. When the CPU 61 executes the control program 65, the computer 60 may act as the routing controller 23, the route calculator 30, and the request message generator 40.

Figure 5:
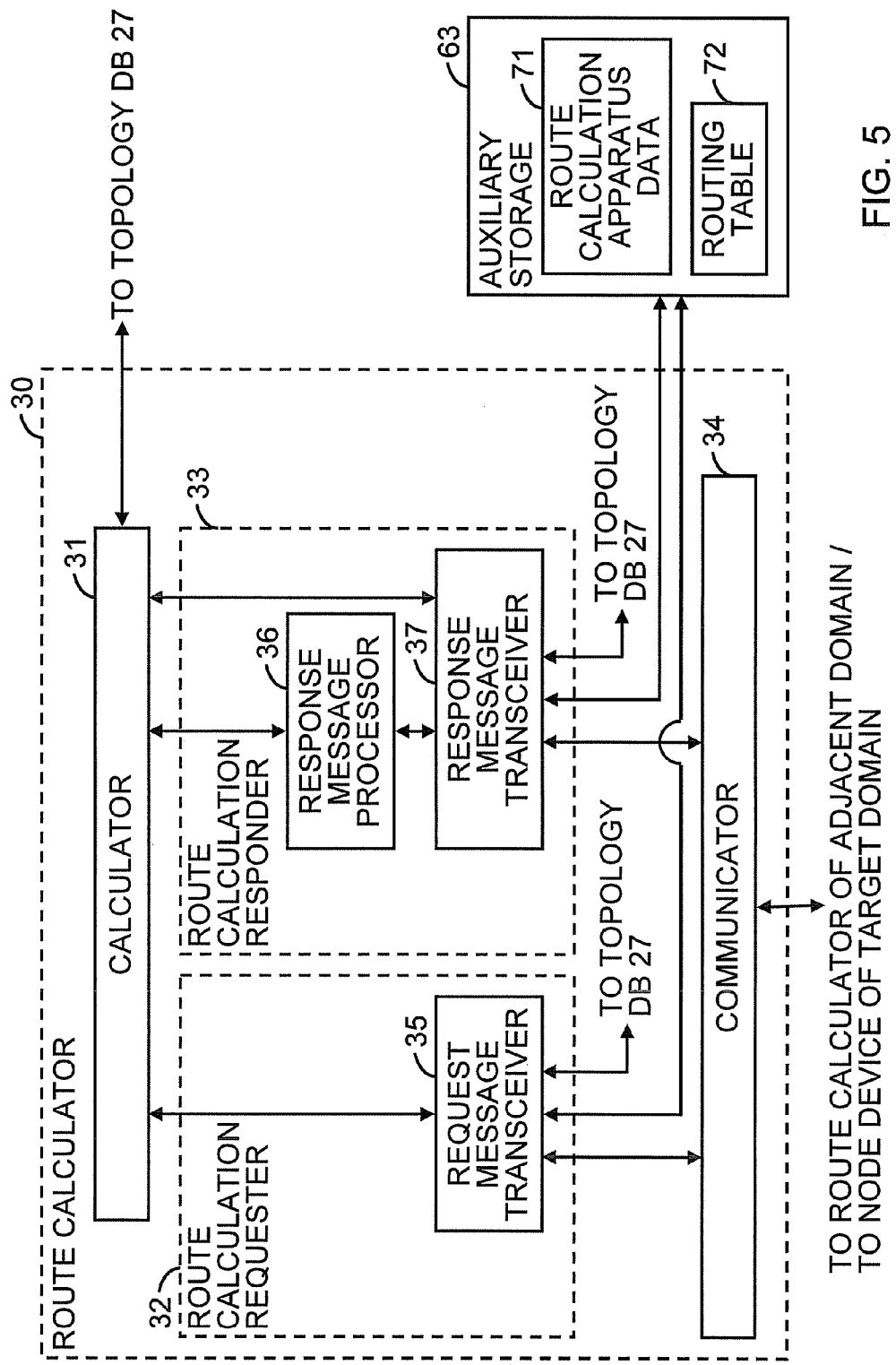
FIG. 5 is a diagram illustrating an example of a hardware configuration of a route calculator of a node device according to an embodiment of the present invention.

FIG. 5 is a diagram illustrating an example of a hardware configuration of a route calculator of a node device according to an embodiment of the present invention. Reference symbol 31 denotes a calculator, reference symbol 32 denotes a route calculation requester, reference symbol 33 denotes a route calculation responder, and reference symbol 34 denotes a communicator. Reference symbol 35 denotes a request message transceiver, reference symbol 36 denotes a response message processor, reference symbol 37 denotes a response message transceiver, reference symbol 71 denotes data (referred to as "route calculation apparatus data") on route calculation apparatuses, and reference symbol 72 denotes a routing table.

The route calculator 30 includes the calculator 31, the route calculation requester 32, the route calculation responder 33, and the communicator 34. In the specification, a specific domain for which a certain route calculator is in charge of calculation of the intra-domain route may be referred to as a "target domain" of the certain route calculator. Further, a specific route calculator that performs calculation of the intra-domain route in a certain domain may be referred to as a route calculator assigned to the certain domain or a route calculator of the certain domain.

The calculator 31 performs calculation of the intra-domain route, out of the route of the target path, in the target domain which is assigned with the route calculator 30. The communicator 34 receives and transmits control signals of the request message or the response message from/to other route calculators that calculates individual intra-domain route in each of the domains A1 to A6. Further, the communicator 34 receives and transmits the control signals of the request message or the response message from/to node devices in the target domain. The function of the communicator 34 is realized by the DCC controller 17 and the LAN controller 18 discussed in FIG. 3.

The route calculation requester 32 performs a process for requesting calculation of the intra-domain route in the destination domain of the route of the target path to the route calculator assigned to the destination domain including the destination node of the target path. The route calculation requester 32 includes the request message transceiver 35. The request message transceiver 35 performs a process for receiving the request message transmitted from other route calculators or node devices in the target domain by using a communication function provided by the communicator 34. When the target domain is not the destination domain of the path for which the received request message requests route calculation, the request message transceiver 35 performs a process for transferring the request message by transmitting the received request message to another route calculator by using the communication function provided by the communicator 34.

The route calculation responder 33 performs a process in regard to the response message responding to the request message. The route calculation responder 33, includes the response message processor 36 and the response message transceiver 37.

When the target domain is the destination domain of the path for which the received request message requests route calculation, the response message processor 36 performs a process for generating the response message responding to the request message. The response message processor 36 stores, into the response message, intra-domain route data representing the intra-domain route, which has been calculated by the calculator 31, in the target domain.

The response message transceiver 37 performs, by using a communication function provided by the communicator 34, a process for transmitting the response message generated by the response message processor 36 and receiving the response message transmitted from another route calculator. When the received response message relates to a path having the source domain other than the target domain, the response message transceiver 37 performs a process for transferring the received response message to another route calculator.

The route calculation apparatus data 71 and a routing table 72 are stored in the auxiliary storage 63. The route calculation apparatus data 71 includes data for determining another route calculator that calculates the intra-domain route in a domain other than the target domain. The route calculation apparatus data 71 may include data, e.g., address data, for accessing another route calculator that calculates the intra-domain route in another domain. The data for accessing another route calculator is used to specify the destination or the source of the message when the request message transceiver 35 and the response message transceiver 37 receives or transmits the request message and the response message, respectively.

In order for the request message or the response message to reach a desired route calculator, the routing table 72 stores address data of the route calculator of the next transfer destination to which the route calculator 30 transfers the request message or the response message. The request message transceiver 35 and the response message transceiver 37 refer to the routing table 72 to determine the route calculator of the next transfer destination of the request message or the response message.

Figure 6:
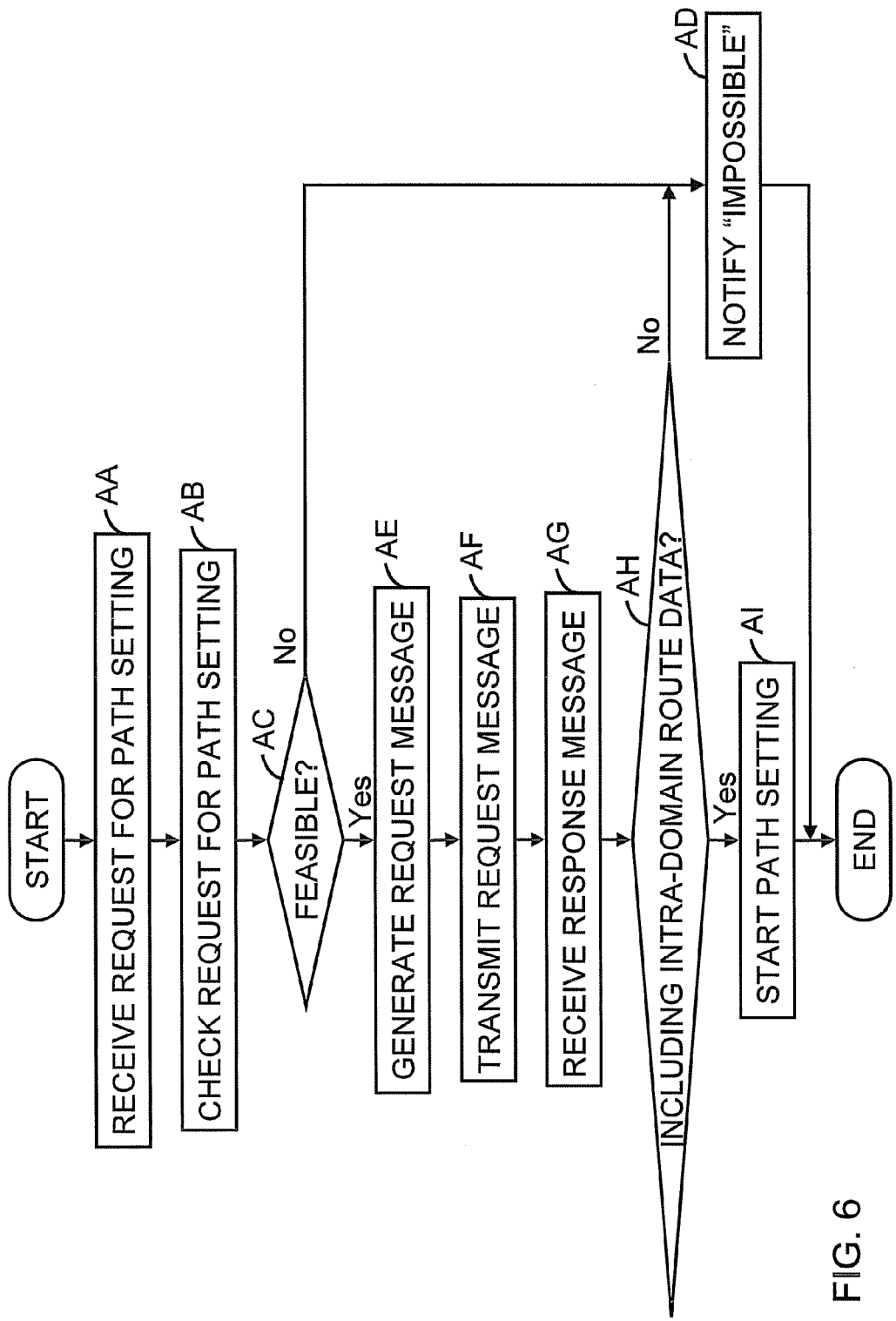
FIG. 6 is a flowchart illustrating an example of an operation flow of a source node device according to an embodiment of the present invention.

Discussions will be given on operations of the components of the routing controller 23 and the route calculator 30. FIG. 6 is a flowchart illustrating an example of an operation flow of a source node device according to an embodiment of the present invention.

In operation AA, the device manager 21 of the source node device S1 receives a command for requesting path setting inputted by an operator or a signal for requesting path setting inputted from the user network interface, and notifies the routing controller 23 of the request for path setting.

In operation AB, the routing controller 23 checks the request for path setting inputted in operation AA.

In operation AC, the routing controller 23 determines whether the request for path setting is a feasible request. When it is determined that the inputted request for path setting is not a feasible request and subsequent path setting process is impossible ("No" in operation AC), the routing controller 23 advances the process to operation AD.

In operation AD, the routing controller 23 sends, in response to the request for path setting, a notification indicating that the requested path setting is impossible. Thereafter, the routing controller 23 ends the process.

When the inputted request for path setting is a feasible request ("Yes" in operation AC), the routing controller 23 advances the process to operation AE.

In operation AE, the request message generator 40 of the routing controller 23 generates a request message in regard to the target path requested by the request for path setting inputted in operation AA. The request message requests calculation of the intra-domain route, out of the route of the target path, in the destination domain A6. FIG. 7 is a diagram illustrating an example of a data format of a request message according to an embodiment of the present invention.

In the example illustrated in FIG. 7, the request message includes a "path ID" field 702, a "source node ID" field 704, a "destination node ID" (also denoted by "DEST. NODE ID" in the drawings) field 706, a "band" field 708, and a "calculation target domain" (also denoted by "CALC. TARGET DOMAIN" in the drawings) field 710. The "path ID" field 702 is a field for specifying a path ID capable of identifying the target path. The "source node ID" field 704 is a field for specifying a source node ID capable of identifying the source node device of the target path. The "destination node ID" field 706 is a field for specifying a destination node ID capable of identifying the destination node device of the target path. The "band" field 708 is a field for specifying a band ID capable of identifying the band used by the target path. The "calculation target domain" field 710 is a field for specifying a domain ID, which is capable of identifying a domain, of a calculation target domain for which the intra-domain route is to be calculated. In this example, the "calculation target domain" field 710 contains a domain ID "A6" of the destination domain A6 which includes the destination node device D1.

In operation AF, the routing controller 23 transmits the request message to the route calculator 30 assigned for calculating the intra-domain route in a domain including the source node device S1. When the route calculator 30 assigned to the domain including the source node device S1 is disposed in another node device other than the source node device S1, the routing controller 23 transmits the request message to the route calculator 30 disposed in the other node device via the DCC controller 17 and/or the LAN controller 18.

FIG. 8 is a sequence diagram illustrating an example of message exchange in route calculation according to an embodiment of the present invention. In the sequence diagram illustrated in FIG. 8, reference symbols C1, C2, C4, and C6 denote route calculation apparatuses assigned for calculating the intra-domain route in each of the domains A1, A2, A4, and A6, respectively.

The request for path setting in operation AA illustrated in FIG. 6 corresponds to operation BA illustrated in FIG. 8. Transmission of the request message from the source node device S1 to the route calculator 30 in operation AF illustrated in FIG. 6 corresponds to transmission of the request message from the source node device S1 to the route calculation apparatus C1 in operation BB illustrated in FIG. 8. As a result of operation BB, the route calculator 30 of the source domain A1 receives the request message transmitted from the source node device S1.

Figure 9:
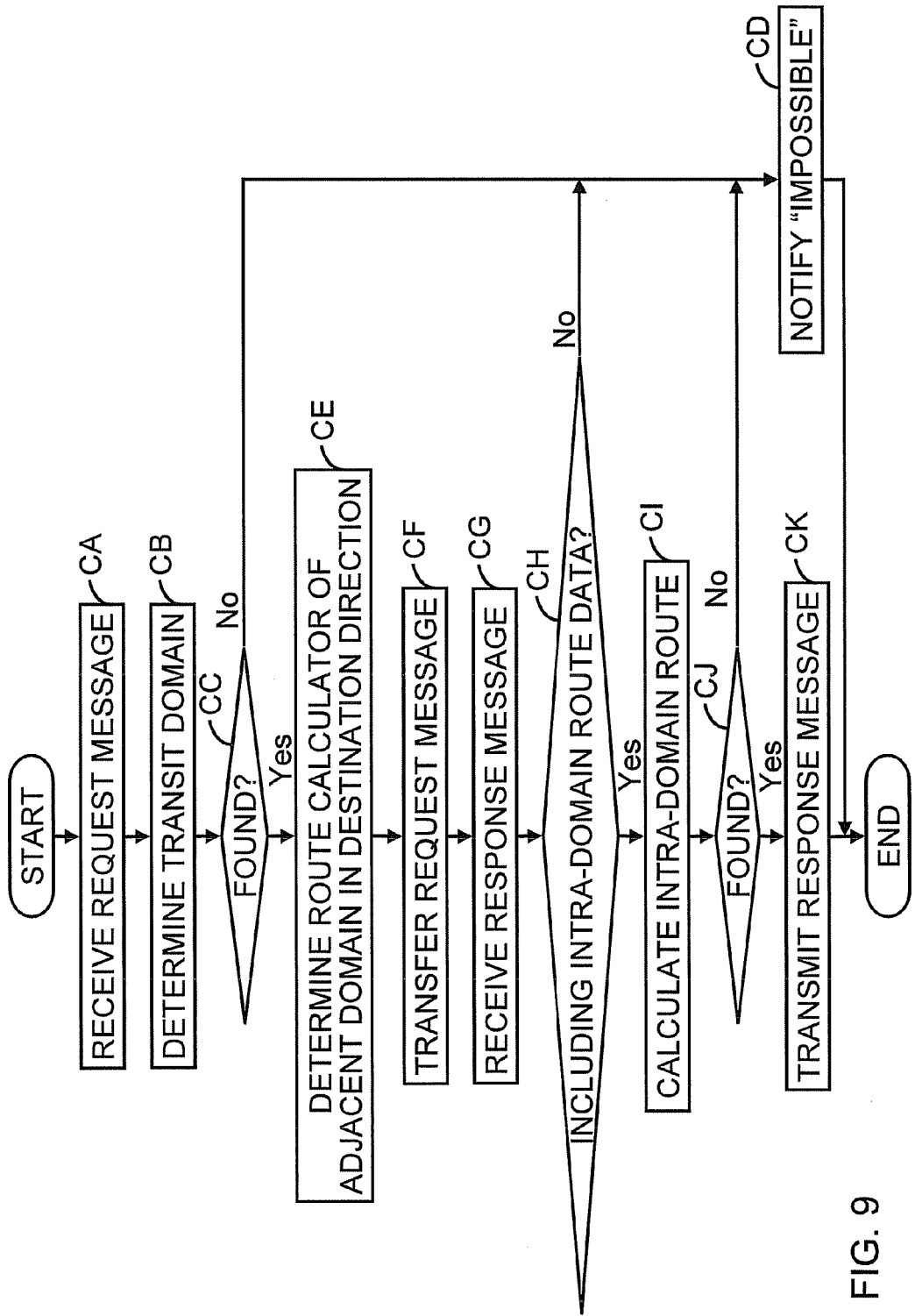
FIG. 9 is a flowchart illustrating an example of an operation flow of a route calculator of a source domain according to an embodiment of the present invention.

FIG. 9 is a flowchart illustrating an example of an operation flow of a route calculator of a source domain according to an embodiment of the present invention.

In operation CA, the request message transceiver 35 of the route calculator 30 illustrated in FIG. 5 receives the request message transmitted from the source node device S1.

In operation CB, the calculator 31 determines a transit domain on the route of the target path which has the source node device S1 and the destination node device D1 specified in "source node ID" field 704 and the "destination node ID" field 706 of the received request message, as the source-side end and the destination-side end, respectively. The calculator 31 determines the transit domain in accordance with the summarized data 50 stored in the topology database 27. The calculator 31 may determine the transit domain by employing a shortest path first (SPF) algorithm such as Dijkstra's algorithm.

In operation CC, the calculator 31 determines whether the transit domain has been found on the route of the target path.

In operation CD, when the transit domain has not been found on the route of the target path ("No" in operation CC), the response message processor 36 generates a response message for notifying the source node device S1 that the requested path setting is impossible. The response message transceiver 37 transmits the response message to the source node device S1. Thereafter, the route calculator 30 ends the process.

In operation CE, when the transit domain has been found on the route of the target path from the source domain A1 to the destination domain A6 ("Yes" in operation CC), the request message transceiver 35 determines a transfer destination of the request message. The request message transceiver 35 determines, in accordance with the summarized data 50, the destination domain A6 including the destination node device D1 specified in the "destination node ID" field 706 of the request message. The request message transceiver 35 determines, in accordance with the routing table 72, a route calculator 30 of an adjacent domain as the next transfer destination to transmit the request message to the route calculator 30 of the destination domain A6.

In operation CF, the request message transceiver 35 transfers the request message to the determined route calculator 30 of the adjacent domain as the next transfer destination.

In the example illustrated in FIG. 8, the adjacent domain as the next transfer destination determined in operation CE illustrated in FIG. 9 is the domain A2.

Figure 10:
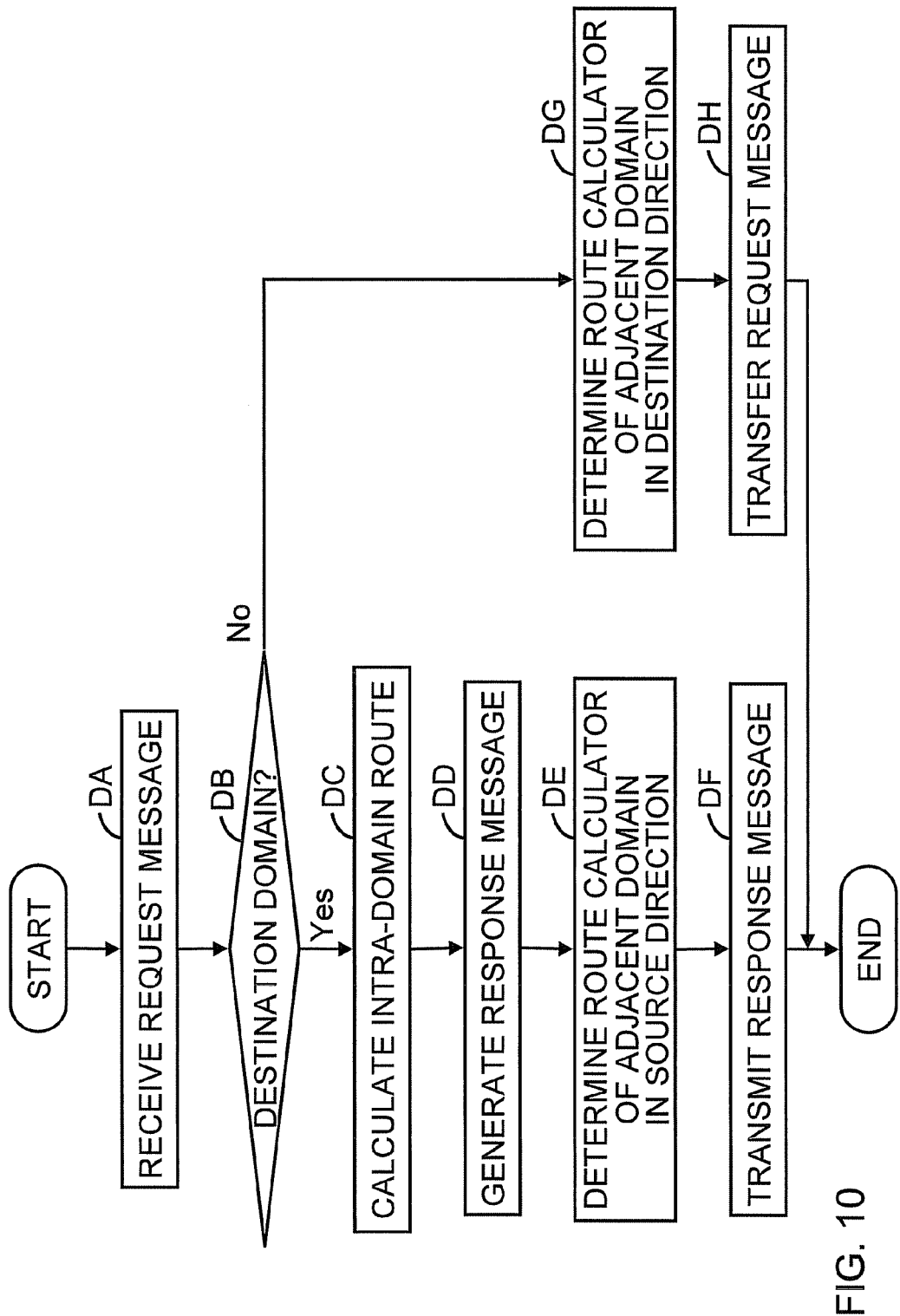
FIG. 10 is a flowchart illustrating an example of an operation flow of a route calculator which has received a request message according to an embodiment of the present invention.

In operation BC, the request message is transferred from the route calculation apparatus C1 of the source domain A1 to the route calculation apparatus C2 of the adjacent domain A2 by transfer process in operation CF illustrated in FIG. 9, FIG. 10 is a flowchart illustrating an example of an operation flow of a route calculator which has received a request message according to an embodiment of the present invention.

In operation DA, the request message transceiver 35 of the route calculator 30 illustrated in FIG. 5 receives the request message transmitted from the route calculator of the adjacent domain.

In operation DB, the request message transceiver 35 determines whether the target domain of the route calculator 30 is the destination domain A6 of the target path. When the target domain is not the destination domain A6 ("No" in operation DB), the route calculator 30 advances the process to operation DG.

In operations DG and DH, the request message transceiver 35 determines the adjacent domain and transfers the request message to the adjacent domain similarly to operations CE and CF illustrated in FIG. 9.

Until the request message reaches the route calculator of the destination domain A6, the route calculators on the transit domains execute operations DA, DB, DG, and DH, thereby transmitting the request message to the route calculator of the destination domain A6.

In operation BD illustrated in FIG. 8, the route calculation apparatus C2 of the domain A2 adjacent to the source domain A1 transfers the request message to the route calculation apparatus C4 of the adjacent domain A4.

In operation BE, the route calculation apparatus C4 transfers the request message to the route calculation apparatus C6 of the destination domain A6 as the adjacent domain.

In operation DC illustrated in FIG. 10, when the route calculator 30 of the destination domain A6 has received the request message, the request message transceiver 35 of the route calculator 30 determines that the target domain is the destination domain A6 ("Yes" in operation DB).

The calculator 31 calculates the intra-domain route in the destination domain A6 which is the target domain. The calculator 31 determines, in accordance with the summarized data 50, transit domains on the route of the target path from the destination domain A6 to the source domain A1. The calculator 31 determines a candidate of the transit domain adjacent to the destination domain A6. The calculator 31 selects, from among the boundary node devices A6-1 to A6-3, a boundary node device having a link for connection to the determined candidate of the transit domain. The calculator 31 calculates, in accordance with the intra-domain topology data 51, the intra-domain route from the selected boundary node device to the destination node device D1. The calculator 31 may calculate the transit domain or the intra-domain route by employing the SPF algorithm such as Dijkstra's algorithm.

Figures 11, 12:
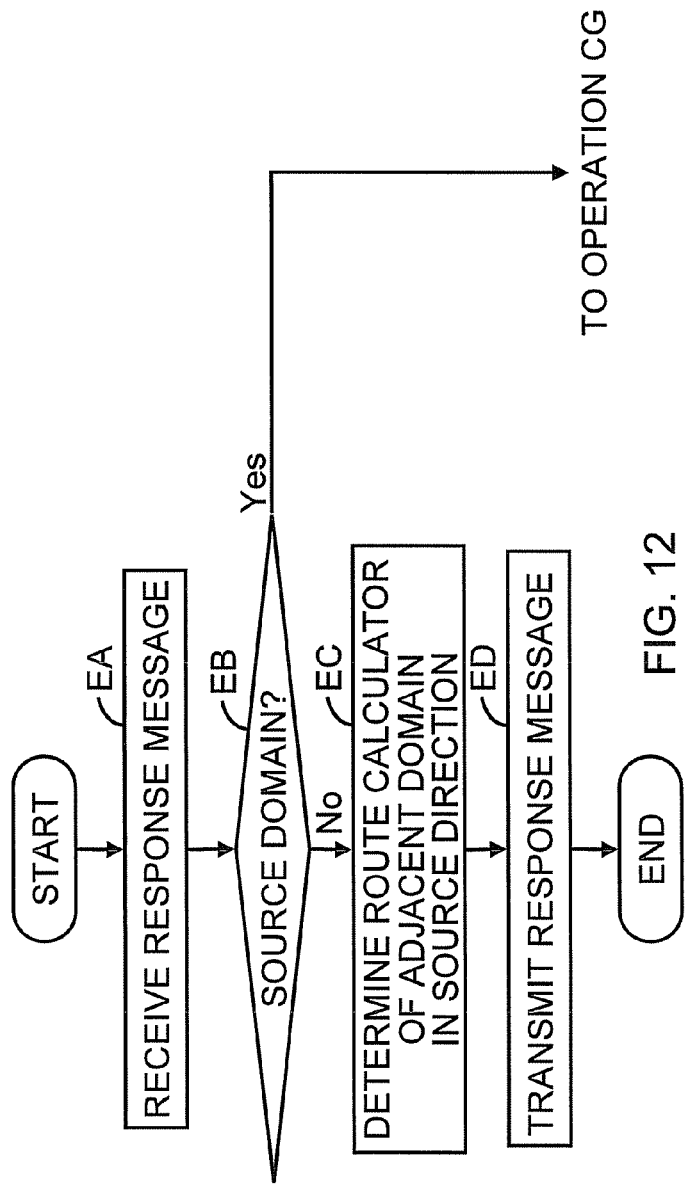
FIG. 11 is a diagram illustrating an example of a data format of a response message responding to the request message illustrated in FIG. 7.
FIG. 12 is a flowchart illustrating an example of an operation flow of a route calculator which has received a response message according to an embodiment of the present invention.

In operation DD, the response message processor 36 generates a response message including intra-domain route data representing the intra-domain route calculated by the calculator 31. FIG. 11 is a diagram illustrating an example of a data format of a response message responding to the request message illustrated in FIG. 7. In the example illustrated in FIG. 11, the response message includes a "path ID" field 1102, a "source node ID" field 1104, a "destination node ID" field 1106, a "band" field 1108, a "calculation target domain" field 1110, and a "route list" field 1112.

The response message processor 36 stores the path ID contained in the "path ID" field 702, the source node ID contained in the "source node ID" field 704, the destination node ID contained in the "destination node ID" field 706, the band ID contained in the "band" field 708, and the domain ID contained in the "calculation target domain" field 710 of the request message into the "path ID" field 1102, the "source node ID" field 1104, the "destination node ID" field 1106, the "band" field 1108, and the "calculation target domain" field 1110 of the response message, respectively. The response message processor 36 further stores a route list into the "route list" field 1112 of the response message. The route list is intra-domain route data representing the intra-domain route calculated by the calculator 31.

The route list includes, at least, designation of a boundary node as one end of the intra-domain route. In the example illustrated in FIG. 11, the intra-domain route passes through the boundary node device A6-2 having a link to the boundary node device A4-5 of the adjacent domain A4. The route list may include designation of the other end as in the example illustrated in FIG. 11. In the example illustrated in FIG. 11, the other end is the destination node device D1.

In operation DE illustrated in FIG. 10, the response message transceiver 37 determines a transmission destination of the response message. The response message transceiver 37 determines, in accordance with the summarized data 50, the source domain A1 including the source node device S1. The response message transceiver 37 determines, in accordance with the routing table 72, a route calculator 30 of an adjacent domain as the next transfer destination of the response message to transmit the response message to the route calculator 30 of the source domain A1.

In operation DF, the response message transceiver 37 transmits the response message to the route calculator 30 of the adjacent domain as the next transfer destination.

In operation BF illustrated in FIG. 8, the response message is transmitted from the route calculation apparatus C6 of the destination domain A6 to the route calculation apparatus C4 of the adjacent domain A4 by transmission process of operation DF illustrated in FIG. 10.

FIG. 12 is a flowchart illustrating an example of an operation flow of a route calculator which has received a response message according to an embodiment of the present invention.

In operation EA, the response message transceiver 37 of the route calculator 30 illustrated in FIG. 5 receives the response message transmitted from the route calculator of the adjacent domain.

In operation EB, the response message transceiver 37 determines whether the target domain of the route calculator 30 is the source domain A1 including the source node device S1 specified in the response message. When the target domain is the source domain A1 ("Yes" in operation EB), the route calculator 30 advances the process to operation CG illustrated in FIG. 9. Operations CG to CK illustrated in FIG. 9 will be discussed later.

When the target domain is not the source domain A1 ("No" in operation EB), the route calculator 30 advances the process to operation EC.

In operations EC and ED, the response message transceiver 37 determines an adjacent domain and transfers the response message to the determined adjacent domain, similarly to operations DE and DF illustrated in FIG. 10.

Until the response message reaches the route calculator of the source domain A1, the route calculators of the transit domains execute operations EA to ED, thereby transmitting the response message to the route calculator of the source domain A1.

In operation BG illustrated in FIG. 8, the route calculation apparatus C4 transfers the response message to the route calculation apparatus C2 by transfer process of operations EA to ED illustrated in FIG. 12.

In operation BH, the route calculation apparatus C2 transfers the response message to the route calculation apparatus C1 of the source domain A1.

In operation CG illustrated in FIG. 9, the response message transceiver 37 of the route calculator 30 of the source domain A1 receives the response message transferred from the adjacent domain.

In operation CH, the calculator 31 determines whether the received response message includes the route list, i.e., the intra-domain route data representing the intra-domain route in the destination domain A6. When the response message does not include the intra-domain route data ("No" in operation CH), the route calculator 30 advances the process to operation CD. The process in operation CD is as mentioned above. Thereafter, the route calculator 30 ends the process.

In operation CI, when the response message includes the intra-domain route data ("Yes" in operation CH), the calculator 31 calculates the intra-domain route in the target domain, i.e., the source domain A1. The calculator 31 determines a boundary node device on the intra-domain route in the destination domain A6 included in the response message, and determines, in accordance with the summarized data 50, a domain including a node device having a link to the determined boundary node device. Further, the calculator 31 determines, in accordance with the summarized data 50, transit domains on the route from the determined domain to the source domain A1. Then, the calculator 31 determines a candidate of the transit domain adjacent to the source domain A1.

The calculator 31 selects, from among the boundary node devices A1-1 to A1-4, a boundary node device which has a link connected to the determined candidate of the transit domain. The calculator 31 calculates, in accordance with the intra-domain topology data 51, the intra-domain route from the selected boundary node device to the source node device S1.

In operation CJ, the calculator 31 determines whether the intra-domain route has been found in operation CI When the intra-domain route has not been found ("No" in operation CJ), the route calculator 30 advances the process to operation CD. The process in operation CD is as mentioned above. Thereafter, the route calculator 30 ends the process.

In operation CK, when the intra-domain route has been found ("Yes" in operation CJ), the response message transceiver 37 adds, to the route list contained in the "route list" field 1112 of the received response message, intra-domain route data representing the intra-domain route, which is calculated in operation CI, in the source domain A1. The response message transceiver 37 transmits, to the source node device S1, the response message which has been added the intra-domain route data to the route list contained in the "route list" field 1112.

In operation BI illustrated in FIG. 8, transmission of the response message from the route calculator 30 to the source node device S1 in operation CK illustrated in FIG. 9 corresponds to transmission of the response message from the route calculation apparatus C1 to the source node device S1. As a consequence of operation BI, the source node device S1 receives the response message transmitted from the route calculator 30 of the source domain A1.

In operation AG illustrated in FIG. 6, the routing controller 23 receives the response message from the route calculator 30 provided for calculating the intra-domain route in the source domain A1. When the route calculator 30 assigned to the domain including the source node device S1 is disposed in a node device other than the source node device S1, the routing controller 23 receives the response message via the DCC controller 17 and/or the LAN controller 18.

In operation AH, the routing controller 23 determines whether the received response message includes the route list, i.e., the intra-domain route data representing the intra-domain routes in the destination domain A6 and the source domain A1 in the "route list" field 1112. When the response message does not include the intra-domain route data ("No" in operation AH), the routing controller 23 advances the process to operation AD. The process in operation AD is as mentioned above. Thereafter, the routing controller 23 ends the process.

In operation AI, when the response message includes the intra-domain route data ("Yes" in operation AH), the routing controller 23 starts path setting for the target path. The routing controller 23 transmits a message of request for path setting which requests route calculation for the target domain and path setting by signaling to each route calculator for calculating the intra-domain route in each domain through which the target path passes.

The route calculator 30 of each domain that receives the message of request for path setting calculates the intra-domain route, which has a specific boundary node device at one end, in the target domain. The specific boundary node device connects to the intra-domain route in the adjacent domain which has transmitted the message of request for path setting. The route calculator 30 determines an adjacent domain having a link to the boundary node device at the other end of the calculated intra-domain route, and transfers the message of request for path setting to the route calculator 30 of the determined adjacent domain.

In operation BJ illustrated in FIG. 8, the routing controller 23 of the source node device S1 transmits the message of request for path setting to the route calculation apparatus C1 of the source domain A1. The route calculator of each domain through which the target path passes performs calculation of the intra-domain route in the target domain and path setting by signaling to set the path from the source node device S1 to the destination node device D1.

Before transmitting the message of request for path setting, the routing controller 23 of the source node device S1 stores, into the message of request for path setting, the intra-domain route data included in the response message. The intra-domain route data stored in the message of request for path setting includes at least boundary node data indicating the boundary node device in each domain. The boundary node data is included in the intra-domain route data stored in the response message.

Upon receiving the message of request for path setting including the intra-domain route data, the route calculator 30 of each domain uses the intra-domain route data, as constraint in the calculation of the intra-domain route in the target domain. That is, the route calculators 30 of the source domain A1 and the destination domain A6 individually calculate an intra-domain route via the same boundary node device included in the intra-domain route calculated in operation CI illustrated in FIG. 9 and operation DC illustrated in FIG. 10, respectively.

The route calculator 30 of each domain passed through between the source domain A1 and the destination domain A6 calculates the intra-domain route in the target domain so that the target path passes through the boundary node device specified in the intra-domain route data. For example, the route calculator 30 selects, in accordance with the summarized data 50, an adjacent domain which is passed through by a route to the boundary node device specified in the intra-domain route data. The route calculator 30 selects a boundary node device, as the boundary node device through which the intra-domain route passes, in the target domain such that the selected boundary node device has a link to a boundary node device in the selected adjacent domain.

The intra-domain route is calculated as mentioned above, thereby setting the path via the same boundary node devices as the boundary node devices on the intra-domain route calculated by operation CI illustrated in FIG. 9 and operation DC illustrated in FIG. 10. It is determined to be possible for the route calculators 30 of the source domain A1 and the destination domain A6 to calculate a route to the source node device S1 and a route to the destination node device D1, respectively, from those boundary node devices. Therefore, at the time of starting path setting in operation AI illustrated in FIG. 6, the route calculation may not fail for the source domain A1 and for the destination domain A6.

According to the present embodiment, the route calculation for the destination domain A6 is performed prior to the route calculation for other domains on the path between the source domain A1 and the destination domain A6, thereby relaxing the constraint in the route calculation for the destination domain A6. Thus, when setting the active path and the backup path for the purpose of the protection as mentioned above, the route calculation for the destination domain, which is more difficult than for other domains, may become easier. Therefore, according to the present embodiment, it may be possible to improve the possibility of succeeding in the route calculation of the whole target path.

According to the present embodiment, as compared with a method employing summarized data including more detailed topology data of the domain for easiness in the route calculation, the amount of the summarized data may be greatly reduced. Furthermore, calculation resources for generating the detailed summarized data may be omitted.

FIG. 13 is a diagram illustrating an example of a data format of a request message according to an embodiment of the present invention. In the example illustrated in FIG. 13, the request message includes a "path ID" field 702, a "source node ID" field 704, a "destination node ID" field 706, a "band" field 708, a "calculation target domain" field 710, and a "recovery type" field 1302. The "path ID" field 702 to the "calculation target domain" field 710 are similar to those of the request message illustrated in FIG. 7. The "recovery type" field 1302 contains recovery type data capable of indicating a type of protection implemented for the target path.

The calculator 31 of the route calculator 30 of a domain specified in the "calculation target domain" field 710 calculates the routes for the active path and the backup path of the target path in accordance with the type of protection specified in the "recovery type" field 1302. The type of protection may be "node-independent" specifying to pass through different node devices for the active path and the backup path or "link-independent" specifying to pass through different links for the active path and the backup path.

FIG. 14 is a diagram illustrating an example of a data format of a response message responding to the request message illustrated in FIG. 13. In the example illustrated in FIG. 14, the response message includes a "path ID" field 1102, a "source node ID" field 1104, a "destination node ID" field 1106, a "band" field 1108, a "calculation target domain" field 1110, a "recovery type" field 1402, and a "route list" field 1112. The path ID" field 1102 to the "calculation target domain" field 1110 and the "route list" field 1112 are similar to those of the response message illustrated in FIG. 11. The response message processor 36 of the route calculator 30 of the destination domain stores, into the "recovery type" field 1402 of the response message, the recovery type data contained in the "recovery type" field 1302 of the request message illustrated in FIG. 13.

In the example of the response message illustrated in FIG. 14, the route list contained in the "route list" field includes data of the route from the destination node device D1 to the boundary node device A6-2 and data of the route from the destination node device D1 to the boundary node device A6-3, as two intra-domain routes calculated for the active path and the backup path. According to the present embodiment, the intra-domain route is calculated in accordance with a desired type of protection.

FIG. 15 is a diagram illustrating an example of a data format of a request message according to an embodiment of the present invention. In the example illustrated in FIG. 15, the request message includes a "path ID" field 702, a "source node ID" field 704, a "destination node ID" field 706, a "band" field 708, a "calculation target domain" field 710, a "recovery type" field 1302, and a "candidate count" (also denoted by "CAND. COUNT" in the drawings) field 1502. The "path ID" field 702 to the "recovery type" field 1302 are similar to those of the request message illustrated in FIG. 13. The "candidate count" field 1502 contains data specifying, to the route calculator 30 of the domain specified in the "calculation target domain" field 710, an amount of candidates for the route. The calculator 31 of the route calculator 30 of the domain specified in the "calculation target domain" field 710 calculates intra-domain routes of the amount of candidates specified in the "candidate count" field 1502.

FIG. 16 is a diagram illustrating an example of a data format of response message responding to the request message illustrated in FIG. 15. In the example illustrated in FIG. 16, the response message includes a "path ID" field 1102, a "source node ID" field 1104, a "destination node ID" field 1106, a "band" field 1108, a "calculation target domain" field 1110, a "recovery type" field 1402, a "candidate count" field 1602, and a "route list" field 1112. The path ID" field 1102 to the "recovery type" field 1402 and the "route list" field 1112 are similar to those of the response message illustrated in FIG. 14. The response message processor 36 of the route calculator 30 of the destination domain stores, into the "candidate count" field 1602 of the response message, the data specifying the amount of candidates for the route contained in the "candidate count" field 1502 of the request message illustrated in FIG. 15.

In the request message illustrated in FIG. 15, the "recovery type" field 1302 contains data indicating that the target path is protected with protection of the "link-independent" type, and the "candidate count" field 1502 contains data indicating that two candidates are to be calculated for the route. Therefore, the example of the response message illustrated in FIG. 16 has a route list including two sets of routes, and each set is obtained by combining intra-domain routes for the active path and the backup path. A first set of routes includes a route from the destination node device D1 to the boundary node device A6-2 and a route from the destination node device D1 to the boundary node device A6-3, as the intra-domain routes for the active path and the backup path, respectively. A second set of routes includes a route from the destination node device D1 to the boundary node device A6-1 and a route from the destination node device D1 to the boundary node device A6-3, as the intra-domain route for the active path and the backup path, respectively. According to the present embodiment, the intra-domain routes of a desired amount of combinations may be calculated.

FIG. 17 is a diagram illustrating an example of a data format of a request message according to an embodiment of the present invention. In the example illustrated in FIG. 17, the request message includes a "path ID" field 702, a "source node ID" field 704, a "destination node ID" field 706, a "band" field 708, a "route data" field 1702, and an "execution flag" field 1704. The "path ID" field 702 to the "band" field 708 are similar to those of the request message illustrated in FIG. 7.

According to the present embodiment, transit domains through which the target path is to pass are specified by the request for path setting in an operator command inputted via a control terminal or in a signal inputted from the user network interface.

When the node device 10 illustrated in FIG. 3 is the source node device S1 and the device manager 21 has received the request for path setting, the request message generator 40 of the node device 10 generates a request message including route data in the "route data" field 1702. The route data specifies the transit domains specified by the request for path setting and a transit order in which the target path passes the transit domains.

According to the present embodiment, specific transit domains are specified in the request for path setting, such that the calculation of the intra-domain route of the target path is to be performed for the specific transit domains. The request message generator 40 generates a request message including execution flags in the "execution flag" field 1704. The execution flags are capable of specifying transit domains for which the intra-domain route is to be calculated. In the example illustrated in FIG. 17, the route data contained in the "route data" field 1702 indicates that the target path is to pass through the domains A1, A2, A4, and A6 in this order. The execution flags contained in the "execution flag" field 1704 specify the transit domains A1, A4, and A6 as transit domains for which the intra-domain route is to be calculated.

FIG. 18 is a diagram illustrating an example of a data format of a response message responding to the request message illustrated in FIG. 17. In the example illustrated in FIG. 18, the response message includes a "path ID" field 1102, a "source node ID" field 1104, a "destination node ID" field 1106, a "band" field 1108, a "route data" field 1802, an "execution flag" field 1804, and a "route list" field 1112. The "path ID" field 1102 to the "band" field 1108 and the "route list" field 1112 are similar to those of the response message illustrated in FIG. 11. The response message processor 36 of the route calculator 30 of the destination domain stores, into the "route data" field 1802 and the "execution flag" field 1804 of the response message, the route data contained in the "route data" field 1702 and the execution flags contained in the "execution flag" field 1704, respectively, of the request message illustrated in FIG. 17.

In the example of the response message illustrated in FIG. 18, the "route list" field 1112 contains the intra-domain route data representing the intra-domain routes calculated for the transit domains A1, A4, and A6 specified by the execution flags. The intra-domain route in the destination domain A6 reaches the boundary node device A6-2 from destination node device D1. The intra-domain route in the transit domain A4 reaches the boundary node device A4-2 from the boundary node device A4-5. The intra-domain route in the source domain A1 reaches the source node device S1 from the boundary node device A1-2. As will be understood from operations of the route calculator 30, which will be discussed later, the intra-domain route data of the transit domains other than the destination domain A6 is sequentially stored in the response message by the route calculator 30 of each of the transit domains when the response message passes through the transit domains in the reverse order of the request message passing.

Figure 19:
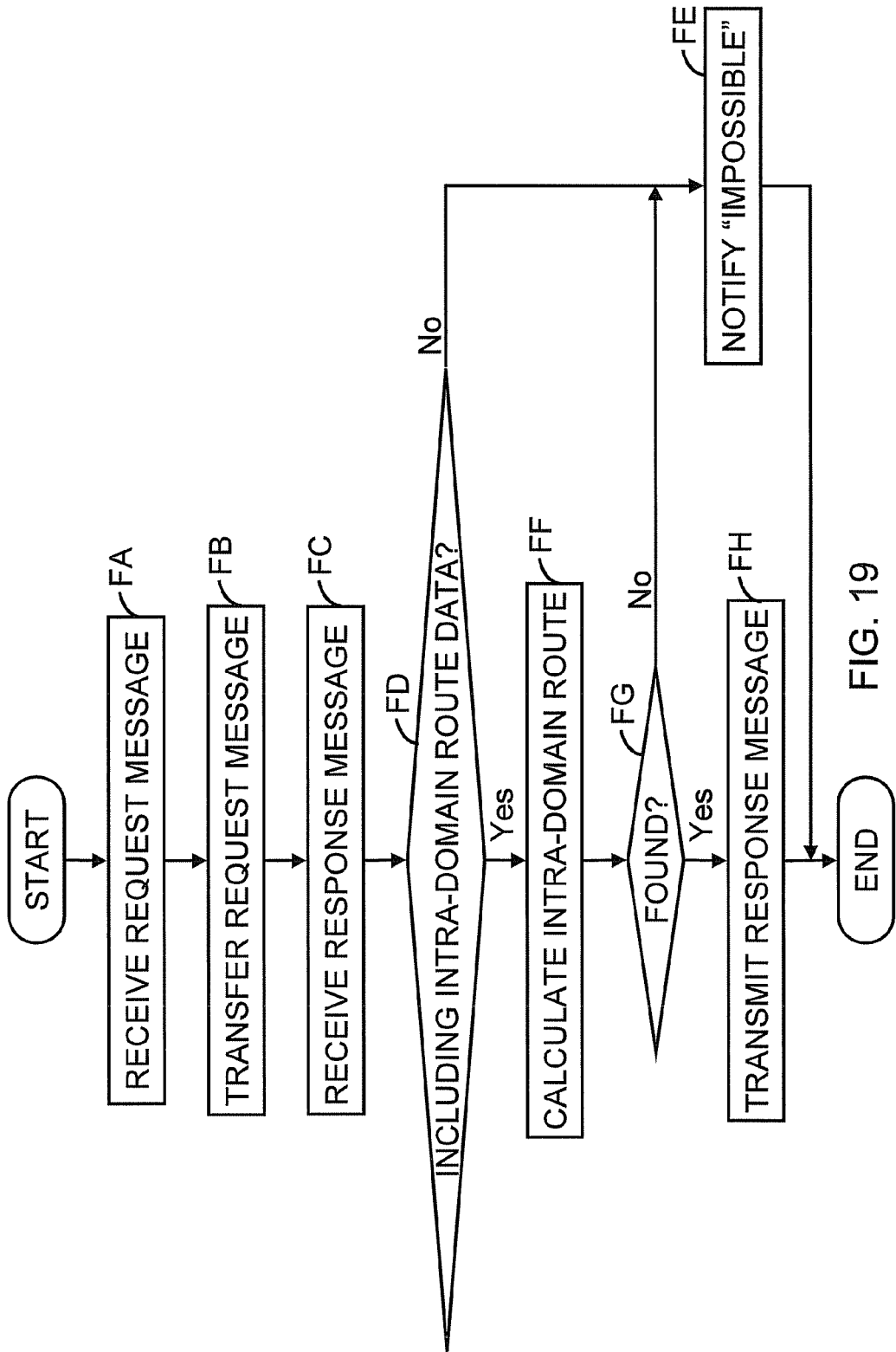
FIG. 19 is a flowchart illustrating an example of an operation flow of a route calculator of a source domain according to an embodiment of the present invention.

FIG. 19 is a flowchart illustrating an example of an operation flow of a route calculator of a source domain according to an embodiment of the present invention.

In operation FA, the request message transceiver 35 of the route calculator 30 illustrated in FIG. 5 receives the request message transmitted from the source node device S1.

In operation FB, the request message transceiver 35 determines, in accordance with the route data included in the received request message, a transit domain next to the source domain A1. In the following discussion, the transit domain subsequent to one domain, in the route data included in the request message or the response message, may also be referred to as a "next domain". Similarly, the transit domain just before one domain, in the route data, may also be referred to as a "previous domain". The request message transceiver 35 determines, in accordance with the route calculation apparatus data 71, the route calculator 30 assigned to the next domain and transfers the request message to the determined route calculator 30.

In operation FC, the response message transceiver 37 receives the response message responding to the request message.

In operation FD, the calculator 31 determines whether the received response message includes the intra-domain route data of the next domain. When the response message does not include the intra-domain route data ("No" in operation FD), the route calculator 30 advances the process to operation FE.

In operation FE, the response message processor 36 generates a response message notifying the source node device S1 that the requested path setting is impossible. The response message transceiver 37 transmits the response message to the source node device S1. Thereafter, the route calculator 30 ends the process.

In operation FF, when the response message includes the intra-domain route data ("Yes" in operation FD), the calculator 31 calculates the intra-domain route in the source domain A1 specified by the execution flags included in the response message.

The calculator 31 determines, in accordance with the route data included in the response message, a next domain of the source domain A1. The calculator 31 determines whether the route list included in the response message contains the intra-domain route data of the determined next domain. When the intra-domain route data of the next domain is included therein, the calculator 31 determines a boundary node device in the next domain, which is specified in the intra-domain route data and has a link to the source domain A1. The calculator 31 selects a boundary node device in the source domain A1, which has a link to the determined boundary node device. The calculator 31 calculates, in accordance with the intra-domain topology data 51, the intra-domain route from the selected boundary node device to the source node device S1. When the intra-domain route data of the next domain is not included, the process for calculating the intra-domain route is similar to operation CI illustrated in FIG. 9.

In operation FG, the calculator 31 determines whether the intra-domain route has been found in operation FF. When the intra-domain route has not been found ("No" in operation FG); the route calculator 30 advances the process to operation FE. The process in operation FE is as mentioned above. Thereafter, the route calculator 30 ends the process.

In operation FH, when the intra-domain route has been found ("Yes" in operation FG), the response message transceiver 37 adds the intra-domain route data of the source domain A1, which has been calculated in operation FF, to the route list included in the received response message. The response message transceiver 37 transmits, to the source node device S1, the response message obtained by adding the intra-domain route data to the route list.

Figure 20:
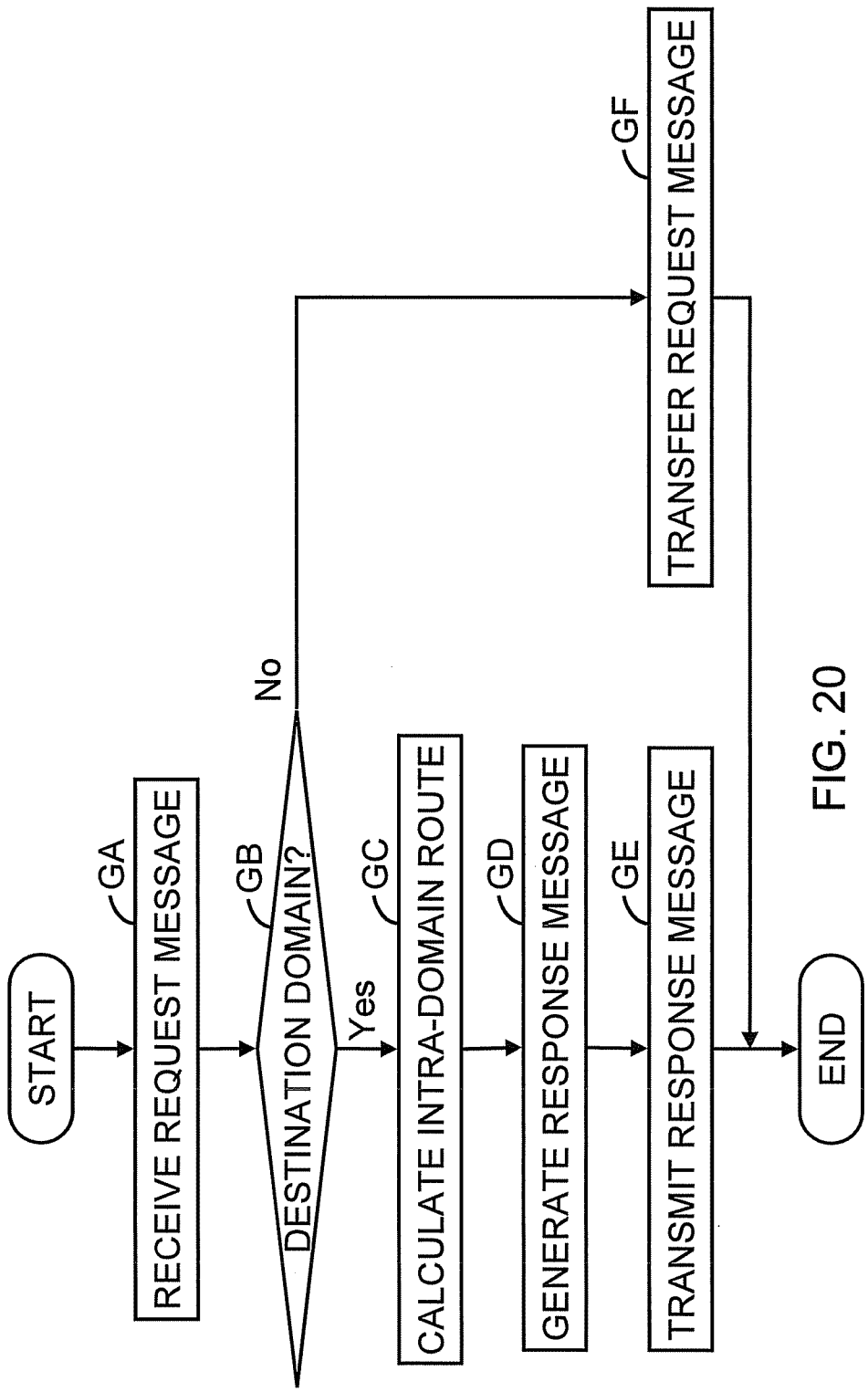
FIG. 20 is a flowchart illustrating an example of an operation flow of a route calculator that has received the request message illustrated in FIG. 17.

FIG. 20 is a flowchart illustrating an example of an operation flow of a route calculator that has received the request message illustrated in FIG. 17.

In operation GA, the request message transceiver 35 of the route calculator 30 illustrated in FIG. 5 receives the request message transmitted from the route calculator of the previous domain.

In operation GB, the request message transceiver 35 determines whether the target domain of the route calculator 30 is the destination domain A6 of the target path. When the target domain is not the destination domain A6 ("No" in operation GB), the route calculator 30 advances the process to operation GF.

In operation GF, the request message transceiver 35 determines a next domain in accordance with the route data included in the received request message, and transfers the request message to the next domain. Execution of operations GA, GB, and GF by the route calculator of each of the transit domains allows the request message to reach the route calculator of the destination domain A6.

When the route calculator 30 of the destination domain A6 receives the request message, the target domain is the destination domain A6 ("Yes" in operation GB).

In operation GC, at this time, the calculator 31 calculates the intra-domain route in the destination domain A6 specified by the execution flags included in the request message. The calculation process of the intra-domain route in operation GC may be similar to that of operation DC illustrated in FIG. 10.

In operation GD, the response message processor 36 generates a response message including the intra-domain route data representing the intra-domain route calculated by the calculator 31. The response message processor 36 stores the path ID contained in the "path ID" field 702, the source node ID contained in the "source node ID" field 704, the destination node ID contained in the "destination node ID" field 706, the band ID contained in the "band" field 708, the route data contained in the "route data" field 1702, and the execution flags contained in the "execution flag" field 1704 of the request message into the "path ID" field 1102, the "source node ID" field 1104, the "destination node ID" field 1106, the "band" field 1108, the "route data" field 1802, and the "execution flag" field 1804 of the response message, respectively.

The response message processor 36 further stores a route list as the intra-domain route data representing the intra-domain route calculated by the calculator 31 into the "route list" field 1112 of the response message.

In operation GE, the response message transceiver 37 determines, in accordance with the route data included in the response message, a previous domain of the destination domain A6, i.e., the transit domain just before the destination domain A6 in the route data. The response message transceiver 37 transfers the response message to the route calculator 30 of the previous domain.

Figure 21:
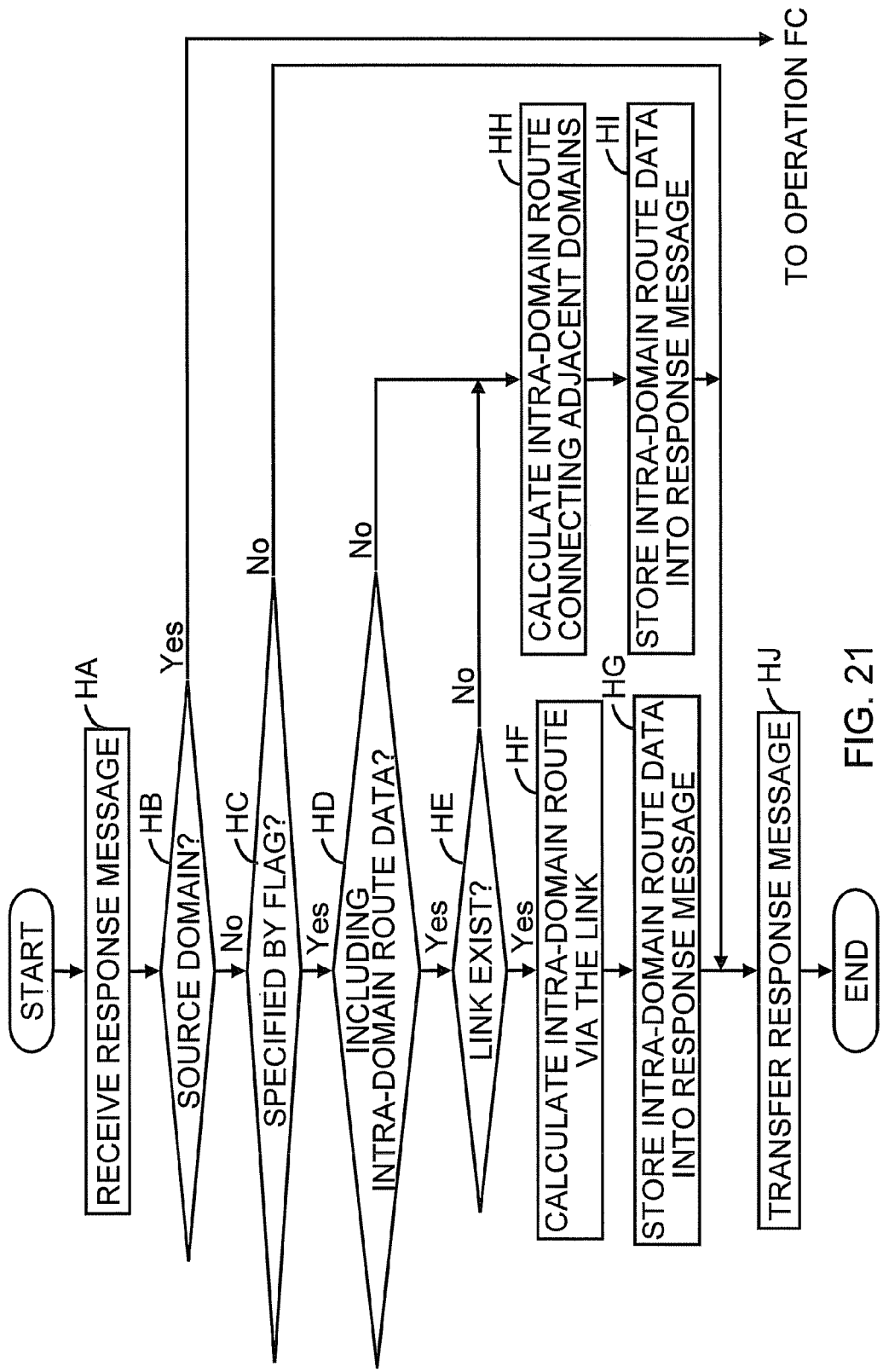
FIG. 21 is a flowchart illustrating an example of an operation flow of a route calculator that has received the response message illustrated in FIG. 18.

FIG. 21 is a flowchart illustrating an example of an operation flow of a route calculator that has received the response message illustrated in FIG. 18.

In operation HA, the response message transceiver 37 of the route calculator 30 illustrated in FIG. 5 receives the response message transmitted from the route calculator of the next domain.

In operation HB, the response message transceiver 37 determines whether the target domain of the route calculator 30 is the source domain A1 including the source node device S1 specified in the response message. When the target domain is the source domain A1 ("Yes" in operation HB), the route calculator 30 advances the process to operation FC illustrated in FIG. 19.

In operation HC, when the target domain is not the source domain A1 ("No" in operation HB), the calculator 31 determines whether the target domain is specified by the execution flags included in the response message. When the target domain is not specified by the execution flags ("No" in operation HC), the route calculator 30 advances the process to operation HJ.

In operation HJ, the response message transceiver 37 determines, in accordance with the route data included in the response message, a previous domain of the target domain and transfers the response message to the route calculator 30 of the previous domain.

In operation HD, when the target domain has been specified by the execution flags ("Yes" in operation HC), the calculator 31 determines whether the route list included in the response message contains the intra-domain route data of the next domain. When the route list does not contain the intra-domain route data of the next domain ("No" in operation HD), the route calculator 30 advances the process to operation HH. When the route list contains the intra-domain route data of the next domain ("Yes" in operation HD), the route calculator 30 advances the process to operation HE.

In operation HF, the calculator 31 determines whether the boundary node device specified by the intra-domain route data of the next domain has a link to any of the boundary node devices in the target domain. When the boundary node device in the next domain does not have any link to the boundary node devices in the target domain ("No" in operation HE), the route calculator 30 advances the process to operation HH. When the boundary node device in the next domain has a link to a boundary node device in the target domain ("Yes" in operation HE), the route calculator 30 advances the process to operation HF.

In operation HF, the calculator 31 calculates the intra-domain route in the target domain. At this time, the calculator 31 calculates the intra-domain route to a boundary node device in the target domain, which has a link to a boundary node device in the previous domain, from the boundary node device in the target domain, which has a link to the boundary node device specified by the intra-domain route data of the next domain.

In operation HG, the response message processor 36 stores the intra-domain route data of the target domain calculated by the calculator 31 into the route list included in the response message received by the response message transceiver 37. Thereafter, the route calculator 30 advances the process to operation HJ.

In operation HH, the calculator 31 calculates the intra-domain route to a boundary node device in the target domain, which has a link to a boundary node device in the previous domain, from a boundary node device in the target domain, which has a link to a boundary node device in the next domain. The calculator 31 may calculate plural intra-domain routes when possible.

In operation HI, the response message processor 36 stores the intra-domain route data of the target domain calculated by the calculator 31 into the route list included in the response message received by the response message transceiver 37. Thereafter, the route calculator 30 advances the process to operation HJ.

In operation HJ, the response message is transferred to the route calculator 30 of the previous domain. Execution of operations HA to HJ by the route calculator of each of the transit domains allows the response message to reach the route calculator of the source domain A1. When the response message passes through each of the transit domains, the intra-domain route data calculated in the each transit domain is sequentially stored into the response message and is transmitted to the route calculator of the source domain A1.

The route calculator of the source domain A1 transmits the response message to the source node device S1. When starting the path setting process of the target path in operation AI illustrated in FIG. 6, the routing controller 23 of the source node device S1 stores the intra-domain route data, which has been stored in the response message, of each transit domain into the message of request for path setting. Upon receiving the message of request for path setting including the intra-domain route data of the target domains, the route calculator 30 of each domain sets a path via the intra-domain route passing through the boundary node device specified by the intra-domain route data.

According to the present embodiment, even when a transit domain has been specified in the request for path setting inputted by an operator command or from the user network interface, the route calculation may be performed while giving priority to the destination domain A6.

FIG. 22 is a diagram illustrating an example of a data format of a request message according to an embodiment of the present invention. In the example illustrated in FIG. 13, the request message includes a "path ID" field 702, a "source node ID" field 704, a "destination node ID" field 706, a "band" field 708, a "calculation target domain" field 710, and a "maximum domain count" field 2202. The "path ID" field 702 to the "calculation target domain" field 710 are similar to those of the request message illustrated in FIG. 7.

The "maximum domain count" field 2202 contains data specifying the maximum amount of domains for which the intra-domain route is calculated. In the present embodiment, the maximum amount of domains is specified by the request for path setting in an operator command inputted via a control terminal or in a signal inputted from the user network interface. The route calculator 30 of each domain calculates the intra-domain route in the target domain when the amount of domains, between the destination domain A6 and the target domain, through which the target path passes is less than or equals to the maximum amount of domains specified in the "maximum domain count" field 2202.

Figure 23:
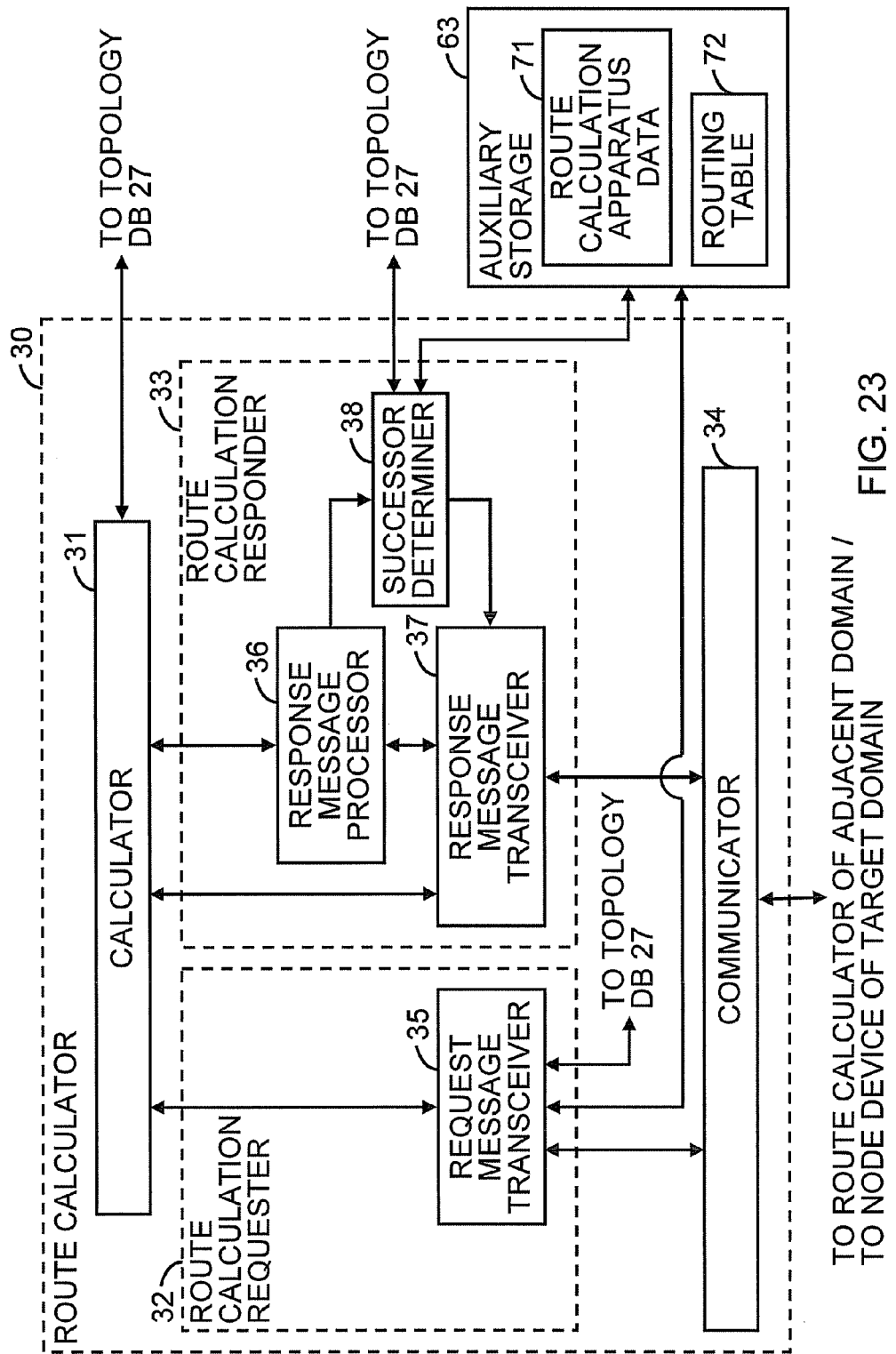
FIG. 23 is a diagram illustrating an example of a hardware configuration of a route calculator of a node device according to an embodiment of the present invention.

FIG. 23 is a diagram illustrating an example of a hardware configuration of a route calculator of a node device according to an embodiment of the present invention. The hardware configuration of the route calculator 30 illustrated in FIG. 23 is similar to that of the route calculator 30 illustrated in FIG. 5, and like reference symbols denote like components. The route calculation responder 33 illustrated in FIG. 23 has a successor determiner 38 that determines a next transfer destination of the request message.

When the target domain is a domain for which the intra-domain route is to be calculated, the successor determiner 38 determines a source-side boundary node device on the target path in source direction from among a pair of boundary node devices, one at the source-side end of the intra-domain route and the other at the destination-side end. The successor determiner 38 determines, as the transmission destination of the response message, a route calculator 30 assigned to the adjacent domain having a link to the source-side boundary node device, in accordance with the summarized data 50.

When the target domain is a domain for which the intra-domain route is not to be calculated, the successor determiner 38 determines, in accordance with the routing table 72, a route calculator 30 of the adjacent domain as the next transfer destination of the request message, for transmitting the request message to the route calculator 30 of the source domain A1.

Figure 24:
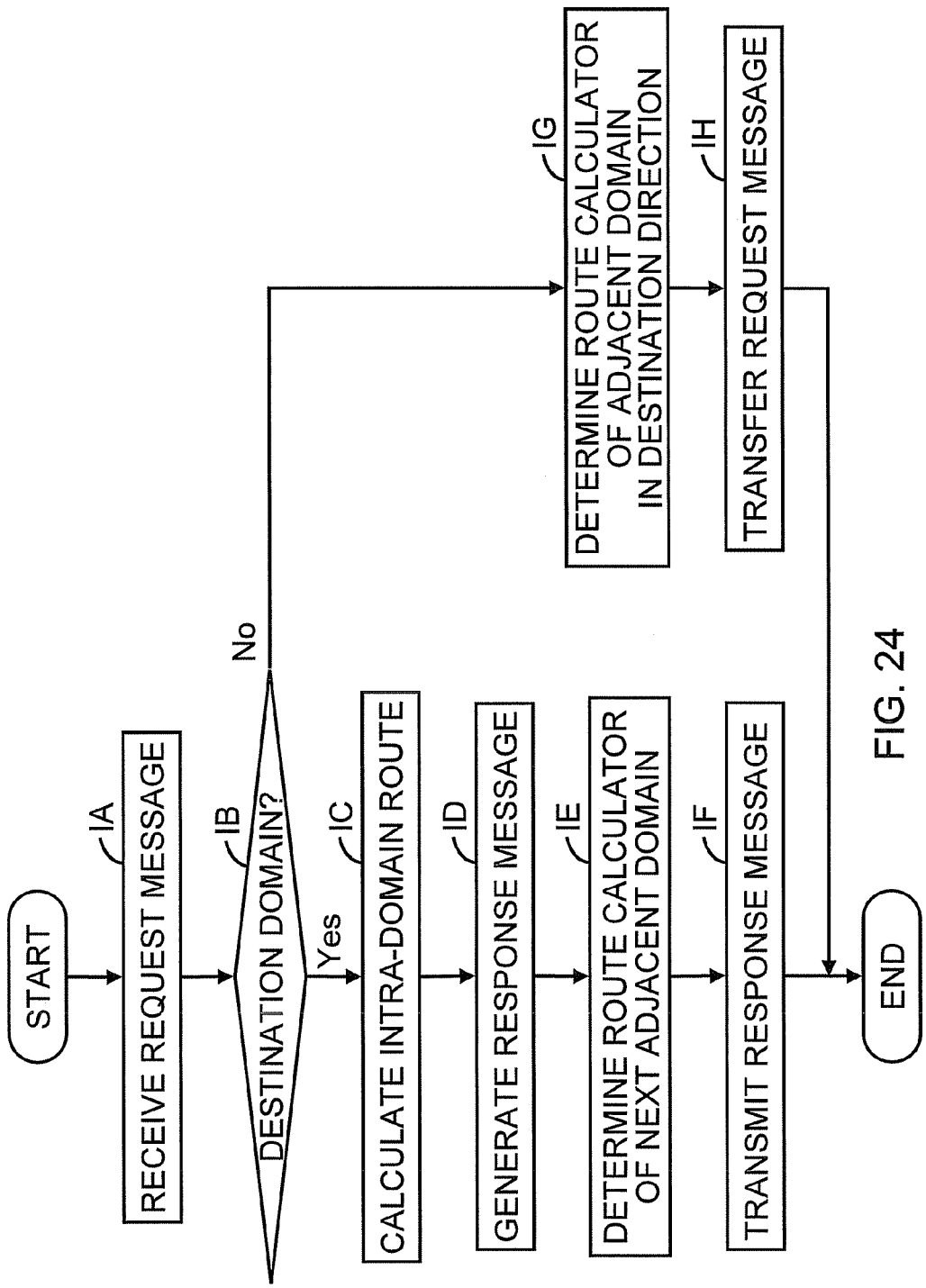
FIG. 24 is a flowchart illustrating an example of an operation flow of a route calculator that has received the request message illustrated in FIG. 22.

FIG. 24 is a flowchart illustrating an example of an operation flow of a route calculator that has received the request message illustrated in FIG. 22.

In operation IA, the request message transceiver 35 of the route calculator 30 illustrated in FIG. 23 receives the request message transmitted from the route calculator of the adjacent domain.

In operation IB, the request message transceiver 35 determines whether the target domain of the route calculator 30 is the destination domain A6 of the target path. When the target domain is not the destination domain A6 ("No" in operation IB), the route calculator 30 advances the process to operation IG.

In operations IG and IH, the request message transceiver 35 determines an adjacent domain and transfers the request message to the determined adjacent domain similarly to operations CE and CF illustrated in FIG. 9.

FIG. 25 is a sequence diagram illustrating an example of message exchange in route calculation according to an embodiment of the present invention. Reference symbols C1, C2, C4, and C6 denote the route calculation apparatuses assigned for the calculation of the intra-domain route in the domains A1, A2, A4, and A6, respectively.

In operations JA to JC, the request message reaches the route calculation apparatus C2 of the domain A2, similarly to operations BA to BC in the sequence diagram illustrated in FIG. 8.

In operations JD to JE, the route calculators of each domain executes operations IA, IB, IG, and IH illustrated in FIG. 24, thereby transferring the request message to the route calculation apparatus C6 of the destination domain A6.

When the route calculator 30 of the destination domain A6 receives the request message, it is determined that the target domain is the destination domain A6 ("Yes" in operation IB illustrated in FIG. 24).

In operation IC illustrated in FIG. 24, the calculator 31 calculates the intra-domain route in the target domain. The process for calculating the intra-domain route in operation IC may be similar to operation DC illustrated in FIG. 10.

In operation ID, the response message processor 36 generates a response message including the intra-domain route data representing the intra-domain route calculated by the calculator 31. FIG. 26 is a diagram illustrating an example of a data format of a response message responding to the request message illustrated in FIG. 22. In the example illustrated in FIG. 26, the response message includes a "path ID" field 1102, a "source node ID" field 1104, a "destination node ID" field 1106, a "band" field 1108, a "calculation target domain" field 1110, a "maximum domain count" field 2602, and a "route list" field 1112. The "path ID" field 1102 to the "calculation target domain" field 1110 and the "route list" field 1112 are similar to those of the response message illustrated in FIG. 11. The response message processor 36 of the route calculator 30 of the destination domain stores, into the "maximum domain count" field 2602 of the response message, the data contained in the "maximum domain count" field 2202 of the request message illustrated in FIG. 22.

In operation IE, the successor determiner 38 determines a boundary node device at one end of the intra-domain route in the destination domain A6. Since the other end of the intra-domain route is the destination node device D1, the determined boundary node device becomes the source-side boundary node device on the target path in source direction. The successor determiner 38 determines, in accordance with the summarized data 50, a route calculator 30 assigned to the adjacent domain and having a link to the source-side boundary node device, as the transmission destination of the response message.

In operation IF, the response message transceiver 37 transmits the response message to the route calculator 30 determined in operation IE.

As will be obviously understood from the above discussion, the transfer destination of the response message changes in accordance with the calculation result of the intra-domain route in the target domain. Therefore, the route of the response message does not necessarily match the route of the request message corresponding to the response message. FIG. 27 is a sequence diagram illustrating an example of a continuation of the sequence illustrated in FIG. 25.

In the sequence illustrated in FIG. 25, the request message passes through the domains A1, A2, A4, and A6 in the order thereof.

in operation JF illustrated in FIG. 27, however, in the present example, the response message is transmitted to the route calculation apparatus C5 of the domain A5, since the intra-domain route passing through the boundary node device having a link to the domain A5 is calculated in the destination domain A6.

In operations JG and JH, the response message is transferred to the route calculation apparatus C1 of the source domain A1 via the route calculation apparatus C3 of the domain A3, by the process of each route calculator 30 that has received the response message, which will be discussed below with reference to FIG. 28.

Figure 28:
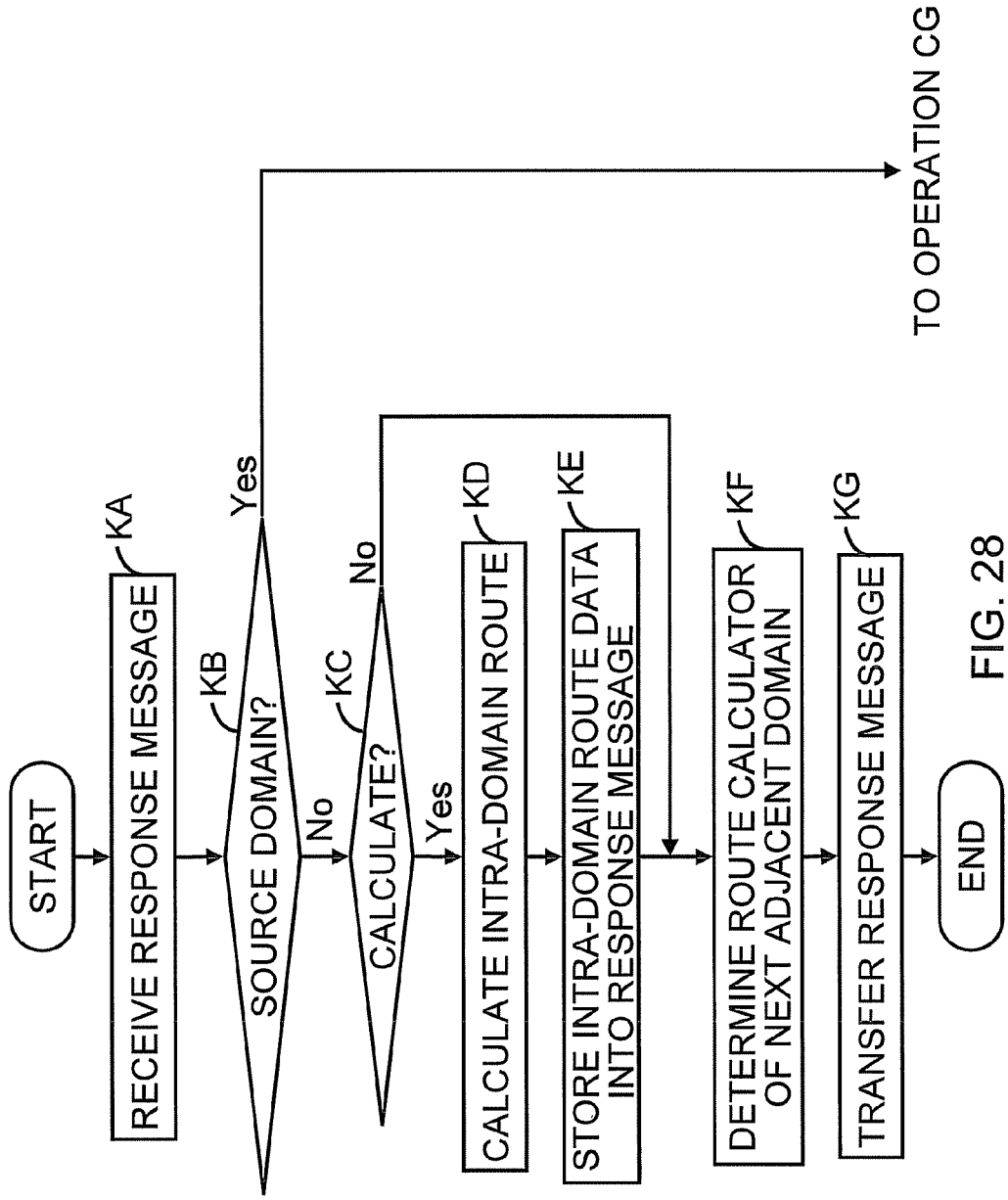
FIG. 28 is a diagram illustrating an example of an operation flow of a route calculator that has received the response message illustrated in FIG. 26.

FIG. 28 is a diagram illustrating an example of an operation flow of a route calculator that has received the response message illustrated in FIG. 26.

In operation KA, the response message transceiver 37 of the route calculator 30 illustrated in FIG. 23 receives the response message transmitted from the route calculator of the adjacent domain.

In operation KB, the response message transceiver 37 determines whether the target domain of the route calculator 30 is the source domain A1 including the source node device S1 specified in the response message. When the target domain is the source domain A1 ("Yes" in operation KB), the route calculator 30 advances the process to operation CG illustrated in FIG. 9.

in operation KC, when the target domain is not the source domain A1 ("No" in operation KB), the calculator 31 determines whether the target domain is a domain for which the intra-domain route is to be calculated. When the amount of domains, between the destination domain A6 and the target domain, through which the target path passes is less than or equals to the specified maximum amount of domains, the calculator 31 determines that the target domain is a domain for which the intra-domain route is to be calculated. The calculator 31 may determine the amount of domains, from the destination domain A6 to the target domain, through which the target path passes in accordance with the domain route data, included in the route list, of each domain.

When the target domain is a domain for which the intra-domain route is to be calculated ("Yes" in operation KC), the route calculator 30 advances the process to operation KD. When the target domain is a domain for which the intra-domain route is not to be calculated ("No" in operation KC), the route calculator 30 advances the process to operation KF.

In operation KD, the calculator 31 calculates the intra-domain route in the target domain. The calculator 31 determines a boundary node device in the target domain, which has a link to the boundary node device in the adjacent domain which has transmitted the response message, in accordance with the intra-domain route data, which is included in the response message, of the adjacent domain. For ease of a discussion, the determined boundary node device is referred to as a boundary node device X.

The calculator 31 determines, in accordance with the summarized data 50, transit domains on the route of the target path from the target domain to the source domain A1. The calculator 31 determines a candidate of a transit domain adjacent to the target domain. The calculator 31 determines a boundary node device having a link to the determined candidate of a transit domain. The determined boundary node device is referred o as a boundary node device Y.

The calculator 31 calculates the intra-domain route from the boundary node device X to the boundary node device Y in accordance with the intra-domain topology data 51.

In operation KE, the response message processor 36 stores the intra-domain route data, which has been calculated by the calculator 31, of the target domain into the "route list" field 1112 of the response message received by the response message transceiver 37.

In operation KF, the successor determiner 38 determines a transmission destination of the response message. When the target domain is the domain for which the intra-domain route is to be calculated ("Yes" in operation KC), the successor determiner 38 determines a source-side boundary node device on the target path in source direction from among the pair of boundary node devices at the source-side end and the destination-side end of the intra-domain route calculated by the calculator 31. The successor determiner 38 determines, in accordance with the summarized data 50, a route calculator 30 assigned to the adjacent domain having a link to the source-side boundary node device, as the transmission destination of the response message.

When the target domain is a domain for which the intra-domain route is not to be calculated ("No" in operation KC), the successor determiner 38 determines, in accordance with the routing table 72, a route calculator 30 of the adjacent domain as the next transfer destination of the response message, for transmitting the response message to the route calculator 30 of the source domain A1.

In operation KG, the response message transceiver 37 transfers the response message to the transmission destination determined by the successor determiner 38.

According to the present embodiment, it may be possible to calculate the intra-domain route in the previous transit domain, which is connected to the intra-domain route calculated for the destination domain, as well as the intra-domain route in the destination domain.

Figure 29:
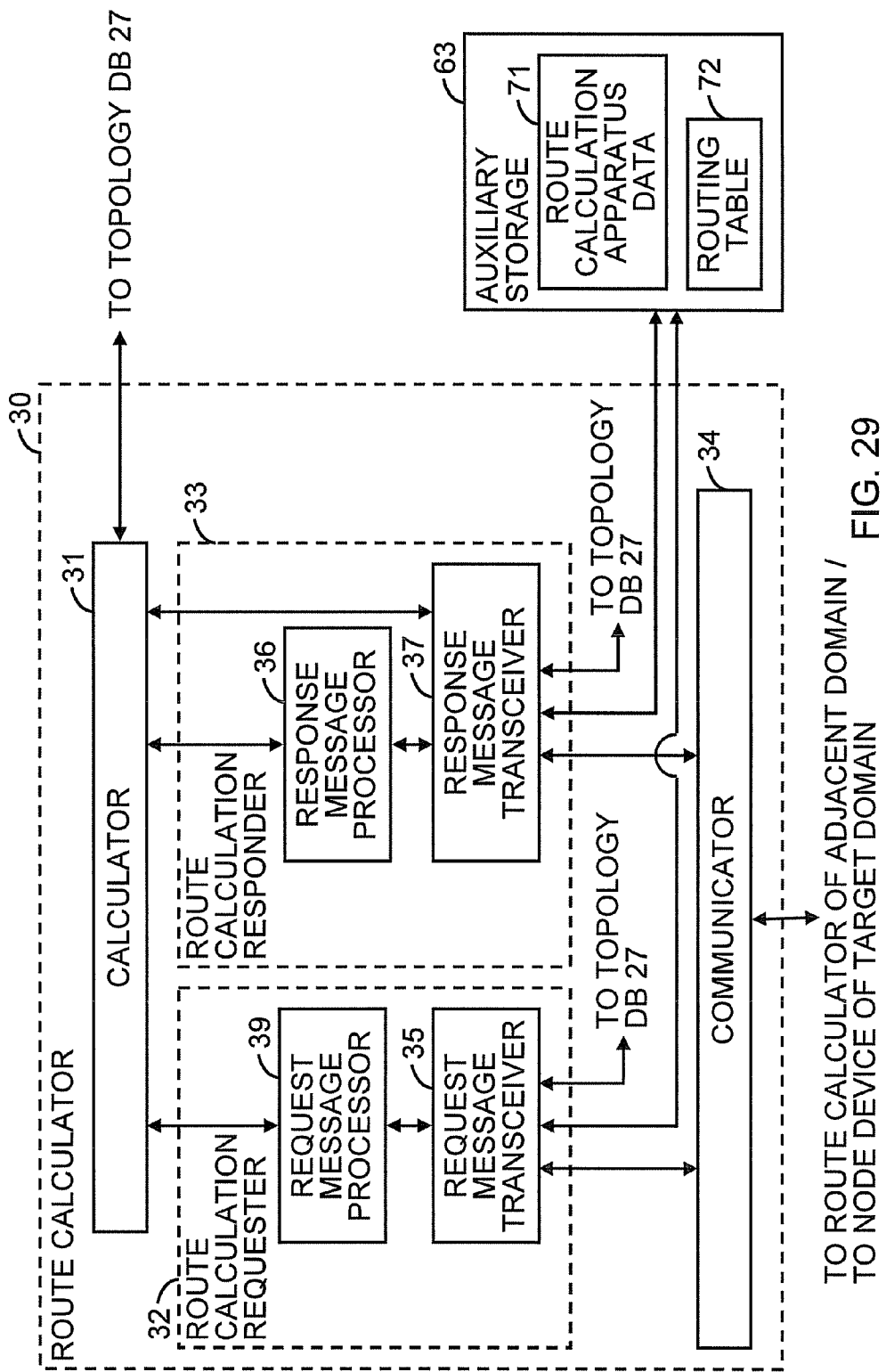
FIG. 29 is a diagram illustrating an example of a hardware configuration of a route calculator of a node device according to an embodiment of the present invention.

FIG. 29 is a diagram illustrating an example of a hardware configuration of a route calculator of a node device according to an embodiment of the present invention. According to the present embodiment, the intra-domain route data representing the intra-domain route, which has been calculated by the route calculator 30 of the source domain A1, in the source domain A1 is stored into the request message, and the request message is transmitted to the route calculator 30 of the destination domain A6. The route calculator 30 illustrated in FIG. 29 includes a request message processor 39 that stores, into the request message, the intra-domain route data representing the intra-domain route calculated by the calculator 31 of the route calculator 30 of the source domain A1.

FIG. 30 is a diagram illustrating an example of a data format of a request message according to an embodiment of the present invention. In the example illustrated in FIG. 30, the request message includes a "path ID" field 702, a "source node ID" field 704, a "destination node ID" field 706, a "band" field 708, a "calculation target domain" field 710, a "recovery type" field 1302, a "candidate count" field 1502, and a "route in source domain" field 3002. The "path ID" field 702 to the "candidate count" field 1502 are similar to those of the request message illustrated in FIG. 15. The "route in source domain" field 3002 contains the intra-domain route data representing the intra-domain route calculated by the calculator 31 of the route calculator 30 of the source domain A1.

When calculating the intra-domain route in the destination domain A6, the calculator 31, that has received the request message, of the destination domain A6 determines, in accordance with the summarized data 50, transit domains on the route to a boundary node device on the intra-domain route in the source domain A1. The calculator 31 determines an adjacent domain of the destination domain A6 from among the determined transit domains, and calculates a route to the destination node device D1 from a boundary node device, which has a link to the boundary node of the determined adjacent domain, of the destination domain A6.

The calculator 31 of the destination domain A6 may calculate, in accordance with the type of protection specified in the "recovery type" field 1302, the routes for the active path and the backup path for protection of the target path. The calculator 31 may calculate, in accordance with the amount of candidates specified in the "candidate count" field 1502, the specified amount of combinations of the intra-domain routes for the active path and the backup path.

In the example of the request message illustrated in FIG. 30, in accordance with the candidate count specified in the "candidate count" field 1502, two sets of the intra-domain route data for the active path and the backup path are stored in the "route in source domain" field 3002 as the intra-domain route data representing the intra-domain route in the source domain A1. The first set includes data in regard to the route for the active path from the source node device S1 to the boundary node device A1-1 and the route for the backup path from the source node device S1 to the boundary node device A1-3. The second set includes data in regard to the route for the active path from the source node device S1 to the boundary node device A1-2 and the route for the backup path from the source node device S1 to the boundary node device A1-4.

FIG. 31 is a diagram illustrating an example of a data format of a response message responding to the request message illustrated in FIG. 30. In the example illustrated in FIG. 31, the response message includes a "path ID" field 1102, a "source node ID" field 1104, a "destination node ID" field 1106, a "band" field 1108, a "calculation target domain" field 1110, a "recovery type" field 1402, a "candidate count" field 1602, a "route in source domain" field 3102, and a "route list" field 1112. The path ID" field 1102 to the "candidate count" field 1602 and the "route list" field 1112 are similar to those of the response message illustrated in FIG. 16. The response message processor 36 of the route calculator 30 of the destination domain A6 stores, into the "route in source domain" field 3102 of the response message, the route data contained in the "route in source domain" field 3002 of the request message illustrated in FIG. 30.

The response message processor 36 of the destination domain A6 stores, into the "route list" field 1112, the intra-domain route data representing the intra-domain route, which has been calculated by the calculator 31 of the destination domain A6, in the destination domain A6. In the example illustrated in FIG. 31, the first set of the intra-domain route data for the active path and the backup path includes data in regard to the route for the active path from the destination node device D1 to the boundary node device A6-2 and the route for the backup path from the destination node device D1 to the boundary node device A6-3. The second set of the intra-domain route data for the active path and the backup path includes data in regard to the route for the active path from the destination node device D1 to the boundary node device A6-1 and the route for the backup path from the destination node device D1 to the boundary node device A6-3.

Figure 32:
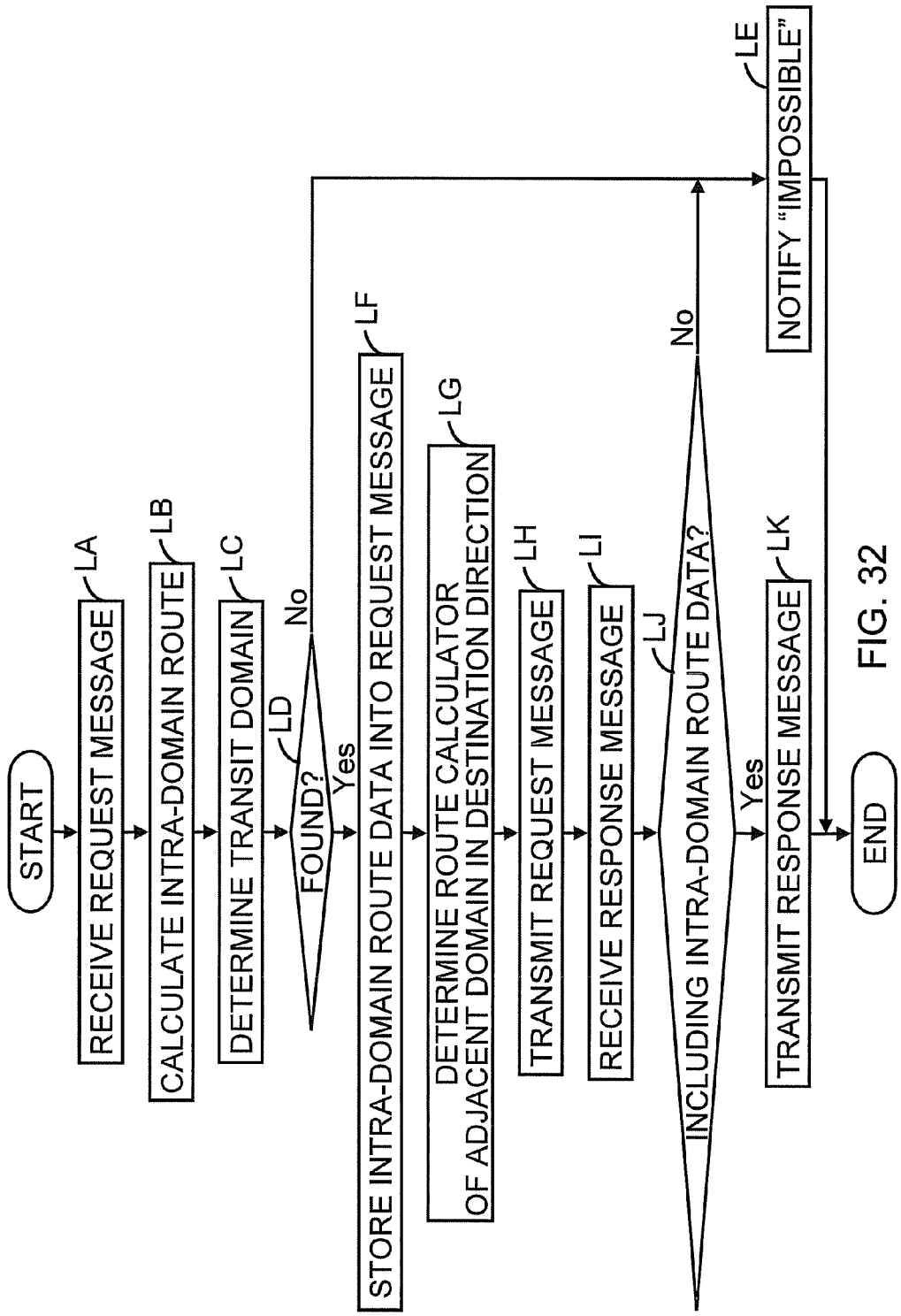
FIG. 32 is a flowchart illustrating an example of an operation flow of a route calculator of a source domain that has received the request message illustrated in FIG. 30.

FIG. 32 is a flowchart illustrating an example of an operation flow of a route calculator of a source domain that has received the request message illustrated in FIG. 30.

In operation LA, the request message transceiver 35 of the route calculator 30 illustrated in FIG. 29 receives the request message transmitted from the source node device S1.

In operation LB, the calculator 31 calculates the intra-domain route in the target domain, i.e., the source domain A1. The calculator 31 determines transit domains on the route of the target path from the source domain A1 to the destination domain A6. The calculator 31 determines a candidate of a transit domain adjacent to the source domain A1. The calculator 31 selects, from among the boundary node devices A1-1 to A1-4, a boundary node device having a link for connection to the determined candidate of the transit domain. The calculator 31 calculates the intra-domain route from the selected boundary node device to the source node device S1.

In operation LC, the calculator 31 determines a transit domain on the route of the target path to the destination node device D1 from the boundary node device on the intra-domain route calculated in operation LB.

In operation LD, the calculator 31 determines whether any transit domain on the route of the target path has been found.

In operation LE, when the transit domain has not been found on the route of the target path ("No" in operation LD), the response message processor 36 generates a response message for the source node device S1, which notifies that the requested path setting is impossible. The response message transceiver 37 transmits the response message to the source node device S1. Thereafter, the route calculator 30 ends the process.

In operation LF, when the transit domain has been found on the route of the target path ("Yes" in operation LD), the request message processor 39 stores the intra-domain route data representing the intra-domain route calculated by the calculator 31 into the request message received from the source node device S1.

In operation LG, the request message transceiver 35 determines, as a transmission destination of the request message, an adjacent domain in destination direction.

In operation LH, the request message transceiver 35 transmits the request message.

In operation LI, the response message transceiver 37 of the source domain A1 receives the response message.

In operation LJ, the calculator 31 determines whether the received response message includes the route list, i.e., the intra-domain route data representing the intra-domain route in the destination domain A6. When the response message does not include the intra-domain route data ("No" in operation LJ), the route calculator 30 advances the process to operation LE. The process in operation LE is as mentioned above. Thereafter, the route calculator 30 ends the process.

In operation LK, when the response message includes the intra-domain route data ("Yes" in operation LJ), the response message transceiver 37 transmits the received response message to the source node device S1.

Figure 33:
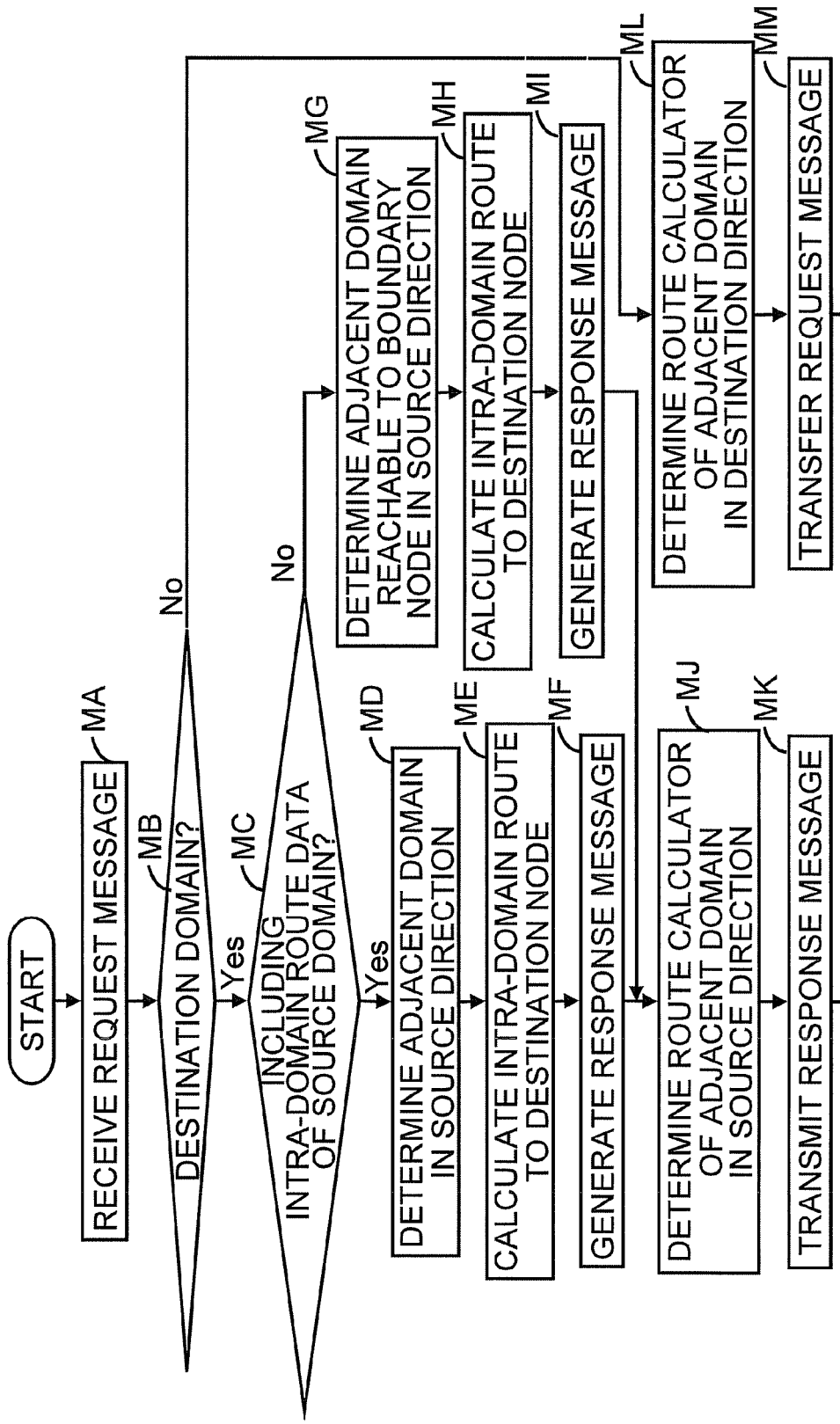
FIG. 33 is a flowchart illustrating an example of an operation flow of a route calculator that has received the request message illustrated in FIG. 30.

FIG. 33 is a flowchart illustrating an example of an operation flow of a route calculator that has received the request message illustrated in FIG. 30.

In operation MA, the request message transceiver 35 of the route calculator 30 illustrated in FIG. 29 receives the request message transmitted from the route calculator of the adjacent domain.

In operation MB, the request message transceiver 35 determines whether the target domain of the route calculator 30 is the destination domain A6 of the target path. When the target domain is not the destination domain A6 ("No" in operation MB), the route calculator 30 advances the process to operation ML.

In operations ML and MM, the request message transceiver 35 determines an adjacent domain and transfers the request message to the determined adjacent domain, similarly to operations CE and CF illustrated in FIG. 9.

When the route calculator 30 of the destination domain A6 receives the request message, the target domain becomes the destination domain A6 ("Yes" in operation MB).

In operation MC, the calculator 31 determines whether the intra-domain route data of the source domain is contained in the "route in source domain" field 3002 of the received request message. When the intra-domain route data of the source domain is contained ("Yes" in operation MC), the route calculator 30 advances the process to operation MD. When the intra-domain route data is not contained ("No" in operation MC), the route calculator 30 advances the process to operation MG.

In operation MD, the calculator 31 determines, in accordance with the summarized data 50, transit domains on the route to the boundary node device on the intra-domain route in the source domain A1. The calculator 31 determines an adjacent domain of the destination domain A6 from among the determined transit domains.

In operation ME, the calculator 31 calculates the route to the destination node device D1 from the boundary node device, which has a link to the boundary node of the determined adjacent domain, of the destination domain A6.

In operation MF, the response message processor 36 generates a response message including the intra-domain route data representing the intra-domain route calculated by the calculator 31. The response message processor 36 stores the path ID contained in the "path ID" field 702, the source node ID contained in the "source node ID" field 704, the destination node ID contained in the "destination node ID" field 706, the band ID contained in the "band" field 708, and the domain ID contained in the "calculation target domain" field 710, the data contained in the "recovery type" field 1302, the data contained in the "candidate count" field 1502, and the route data contained in the "route in source domain" field 3002 of the received request message into the "path ID" field 1102, the "source node ID" field 1104, the "destination node ID" field 1106, the "band" field 1108, the "calculation target domain" field 1110, the "recovery type" field 1402, the "candidate count" field 1602, and the "route in source domain" field 3102, respectively. The response message processor 36 further stores a route list as the intra-domain route data representing the intra-domain route calculated by the calculator 31 into the "route list" field 1112 of the response message.

In operations MJ and MK, the response message transceiver 37 determines an adjacent domain and transmits the response message to the determined adjacent domain, similarly to operations DE and DF illustrated in FIG. 10. Thereafter, the route calculator 30 ends the process.

In operation MG, the calculator 31 determines, in accordance with the summarized data 50, transit domains on the route to a boundary node device of the source domain A1. The calculator 31 determines an adjacent domain of the destination domain A6 from among the determined transit domains.

In operation MH, the calculator 31 calculates the route to the destination node device D1 from the boundary node device, which has a link to the boundary node of the determined adjacent domain, of the destination domain A6.

In operation MI, the response message processor 36 generates a response message including the intra-domain route data representing the intra-domain route calculated by the calculator 31. The response message processor 36 stores the path ID contained in the "path ID" field 702, the source node ID contained in the "source node ID" field 704, the destination node ID contained in the "destination node ID" field 706, the band ID contained in the "band" field 708, and the domain ID contained in the "calculation target domain" field 710, the data contained in the "recovery type" field 1302, the data contained in the "candidate count" field 1502, and the route data contained in the "route in source domain" field 3002 of the received request message into the "path ID" field 1102, the "source node ID" field 1104, the "destination node ID" field 1106, the "band" field 1108, the "calculation target domain" field 1110, the "recovery type" field 1402, the "candidate count" field 1602, and the "route in source domain" field 3102, respectively. The response message processor 36 further stores a route list as the intra-domain route data representing the intra-domain route calculated by the calculator 31 into the "route list" field 1112 of the response message.

In operations MJ and MK, the response message transceiver 37 determines an adjacent domain, similarly to operations DE and DF illustrated in FIG. 10, and transmits the response message to the determined adjacent domain. Thereafter, the route calculator 30 ends the process.

According to the present embodiment, the intra-domain route is calculated starting from the source domain A1 of the two domains, i.e., the source domain A1 and the destination domain A, both of which have a high risk of failing the route calculation. Thereafter, the intra-domain route in the destination domain A6 is calculated. Therefore, the route calculation of the intra-domain route in the destination domain A6 may be possible so as to easily reach the boundary node device, from which the intra-domain route has been calculated to the source node device S1, of the source domain A1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A route calculation apparatus comprising:
one or more computer processors that execute operations of:
   requesting, from a target domain, a route calculation apparatus assigned to a destination domain to calculate an intra-domain route in the destination domain when determining the target domain is one of plural domains except the destination domain and except domains adjacent to the destination domain; and
   calculating, prior to performing route calculation in the plural domains other than the destination domain, an intra-domain route in the destination domain which is outside a target path;
   communicating with other route calculation apparatuses for calculating individual intra-domain routes in the plural domains;
   transmitting and receiving a request message sent in the requesting, the request message including data which specifies a destination node device and the destination domain, the request message requesting calculating of the intra-domain route in the destination domain;
   generating a response message based on the calculating of the intra-domain route in the destination domain; and
   transmitting the response message to the target domain, wherein, upon receiving the request message:
      calculating a route from a boundary node device of the destination domain to the destination node device as the intra-domain route in the destination domain, the boundary node device having a link to a node device of an adjacent domain,
      storing, into the response message, intra-domain route data which represents the intra-domain route in the destination domain,
   wherein the transmitting of the response message transmits the response message including the intra-domain route data representing the intra-domain route in the destination domain to a second route calculation apparatus assigned to a source domain to calculate an intra-domain route in the source domain; and
   a storage storing summarized data, the summarized data including data in regard to relation of connection among the plural domains and data in regard to node devices included in each of the plural domains, wherein
the one or more computer processors executes:
   determining a transmission destination of the response message to be transmitted from the response message transceiver,
   wherein the request message and the response message include data specifying a source node device,
   a processor stores, into the response message, intra-domain route data which represents the intra-domain route in the target domain, the intra-domain route being calculated by the calculating,
   the determining determines a boundary node device on the intra-domain route, which has been calculated for the target domain by the calculating, in a source direction, and determines, as the transmission destination of the response message, a route calculation apparatus assigned to an adjacent domain, the adjacent domain including a boundary node device which has a link to the determined boundary node device,
   a processor transmits the response message to the transmission destination determined by the determining,
   the calculating determines, upon receiving a response message from another route calculation apparatus, a first boundary node device of the target domain, the first boundary node device having a link to a boundary node device on an intra-domain route of an adjacent domain, intra-domain route data which represents the intra-domain route of the adjacent domain being included in the received response message, determines, in accordance with the summarized data, a second boundary node device of the target domain, the second boundary node device having a link to a boundary node device of an adjacent domain passed by a route to the source domain from the target domain, and calculates, as the intra-domain route in the target domain, a route from the second boundary node device to the first boundary node device,
   wherein the request message and the response message include data specifying a maximum amount of domains for which the intra-domain route is calculated, and
   wherein the calculating calculates the intra-domain route in the target domain only when an amount of domains through which a target path passes from the destination domain to the target domain is less than or equals to the maximum amount.

2. The route calculation apparatus of claim 1, wherein
the request message includes protection type data capable of indicating a type of protection implemented for a target path, and
the calculating calculates a route for an active path and a route for a backup path in accordance with the protection type data upon receiving a request message including data specifying the target domain as the destination domain.

3. The route calculation apparatus of claim 1, wherein
the request message includes data specifying an amount of candidates to be calculated for the route, and
the calculating calculates the specified amount of routes upon receiving a request message including data specifying the target domain as the destination domain.

4. The route calculation apparatus of claim 1, wherein
the request message includes route data specifying transit domains through which a target path is to pass and a transit order in which the target path passes the transit domains,
the request message includes execution instruction data specifying transit domains, from among the transit domains included in the route data, for which the intra-domain route is to be calculated,
wherein transfer of the request message is controlled such that the request message is transferred, in the transit order specified by the route data, through the route calculation apparatuses assigned to the transit domains, and
the calculating determines two domains adjacent in the transit order to the target domain and calculates an intra-domain route, which connects the determined two domains, in the target domain only when the execution instruction data specifies the target domain.

5. The route calculation apparatus of claim 4, wherein
transfer of the response message is controlled such that the response message is transferred, in reverse order of the transit order, through the route calculation apparatuses assigned to the transit domains, and a processor stores, into the response message, intra-domain route data which represents the intra-domain route in the target domain, the intra-domain route being calculated by the calculator, and the calculating determines, upon receiving a response message from another route calculation apparatus, a boundary node device of the target domain, the boundary node device of the target domain having a link to a boundary node device on an intra-domain route of an adjacent domain, intra-domain route data which represents the intra-domain route of the adjacent domain being included in the received response message, and calculates, as the intra-domain route in the target domain, a route which passes the determined boundary node device.

6. The route calculation apparatus of claim 1, wherein the one or more computer processors executes storing, into the request message, intra-domain route data which represents the intra-domain route in the target domain, the intra-domain route being calculated by the calculating; and the route calculation apparatus includes a storage storing summarized data, the summarized data including data in regard to relation of connection among the plural domains and data in regard to node devices included in each of the plural domains, wherein, upon receiving a request message including data specifying the target domain as the destination domain, the calculating determines, in accordance with the summarized data, an adjacent domain of the target domain passed by a route to the intra-domain route in the source domain, intra-domain route data which represents the intra-domain route in the source domain being included in the request message, and calculates, as the intra-domain route in the target domain, a route to the destination node device from a boundary node device of the target domain, the boundary node device of the target domain having a link to a boundary node device of the determined adjacent domain.

7. A route calculation method comprising:

requesting, from a target domain, a route calculation apparatus assigned to a destination domain to calculate an intra-domain route in the destination domain when determining the target domain is one of plural domains except the destination domain and except domains adjacent to the destination domain;

calculating, prior to performing route calculation in the plural domains other than the destination domain, an intra-domain route in the destination domain which is outside a target path;

communicating with other route calculation apparatuses for calculating individual intra-domain routes in the plural domains;

transmitting and receiving a request message sent in the requesting, the request message including data which specifies a destination node device and the destination domain, the request message requesting calculating of the intra-domain route in the destination domain;

generating a response message based on the calculating of the intra-domain route in the destination domain;

transmitting the response message to the target domain;

upon receiving the request message, calculating a route from a boundary node device of the destination domain to the destination node device as the intra-domain route in the destination domain, the boundary node device having a link to a node device of an adjacent domain, and storing, into the response message, intra-domain route data which represents the intra-domain route in the destination domain;

transmitting the response message including the intra-domain route data representing the intra-domain route in the destination domain to a second route calculation apparatus assigned to a source domain to calculate an intra-domain route in the source domain;

storing summarized data, the summarized data including data in regard to relation of connection among the plural domains and data in regard to node devices included in each of the plural domains;

determining a transmission destination of the response message to be transmitted from the response message transceiver, wherein the request message and the response message include data specifying a source node device;

storing, into the response message, intra-domain route data which represents the intra-domain route in the target domain, the intra-domain route being calculated by the calculating;

determining a boundary node device on the intra-domain route, which has been calculated for the target domain by the calculating, in a source direction, and determining, as the transmission destination of the response message, a route calculation apparatus assigned to an adjacent domain, the adjacent domain including a boundary node device which has a link to the determined boundary node device;

transmitting the response message to the transmission destination determined by the determining;

determining, upon receiving a response message from another route calculation apparatus, a first boundary node device of the target domain, the first boundary node device having a link to a boundary node device on an intra-domain route of an adjacent domain, intra-domain route data which represents the intra-domain route of the adjacent domain being, included in the received response message, determining, in accordance with the summarized data, a second boundary node device of the target domain, the second boundary node device having a link to a boundary node device of an adjacent domain passed by a route to the source domain from the target domain, and calculating, as the intra-domain route in the target domain, a route from the second boundary node device to the first boundary node device, wherein the request message and the response message include data specifying a maximum amount of domains for which the intra-domain route is calculated; and calculating the intra-domain route in the target domain only when an amount of domains through which a target path passes from the destination domain to the target domain is less than or equals to the maximum amount.

8. The route calculation apparatus of claim 1, wherein the intra-domain route calculated in the calculating, links a destination node of the destination domain to a boundary node of the destination domain.

9. The route calculation apparatus of claim 1, wherein the processor executes operations comprising:

generating a response message including data of the calculated intra-domain route and transmitting to a target domain determined to be a source domain;

calculating an intra-domain route in the source domain based on receipt of the response message generated;

generating a second response message including data of the calculated intra-domain route in the destination domain and the calculated intra-domain route of the source domain; and calculating an intra-domain route in at least one of the plural domains between the source domain and the target domain based on receipt of the second response message generated.

* * * * *

UNITED STATES PATENT AND TRADEMARK OFFICE
CERTIFICATE OF CORRECTION

Page 1 of 1

PATENT NO. : 9,001,692 B2
APPLICATION NO. : 12/695330
DATED : April 7, 2015
INVENTOR(S) : Keiji Miyazaki It is certified that error appears in the above-identified patent and that said Letters Patent is hereby corrected as shown below:

In the Claims

Column 32, Line 40, In Claim 7, delete "being," and insert -- being --, therefor.

Signed and Sealed this
Eighteenth Day of August, 2015

Michelle K. Lee
*Director of the United States Patent and Trademark Office*